(12) United States Patent  (10) Patent No.: US 8,137,210 B2
Gobush  (45) Date of Patent: Mar. 20, 2012

(54) PERFORMANCE MEASUREMENT SYSTEM WITH QUANTUM DOTS FOR OBJECT IDENTIFICATION

(75) Inventor: William Gobush, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 1685 days.

(21) Appl. No.: 10/999,924

(22) Filed: Dec. 1, 2004

(65) Prior Publication Data

US 2005/0114073 A1   May 26, 2005

Related U.S. Application Data

(63) Continuation-in-part of application No. 10/002,174, filed on Dec. 5, 2001, now Pat. No. 7,086,954.

(51) Int. Cl.
*A63B 43/00* (2006.01)
(52) U.S. Cl. ....................................... 473/353
(58) Field of Classification Search .................. 473/353, 473/140, 156, 151, 152, 155, 198; 273/317.2, 273/359
See application file for complete search history.

(56) References Cited

U.S. PATENT DOCUMENTS

| | | |
|---|---|---|
| 1,876,657 A | 5/1932 | Fox |
| 2,472,893 A | 6/1949 | Lyle |
| 2,610,504 A | 4/1952 | Nigh |
| 2,660,880 A | 12/1953 | Vivian |
| 2,755,658 A | 7/1956 | Brown |
| 2,783,999 A | 3/1957 | Simjian |
| 2,825,569 A | 3/1958 | Alvarez |
| 2,933,681 A | 4/1960 | Crain |
| 3,016,812 A | 1/1962 | Chatlain |
| 3,091,466 A | 5/1963 | Speiser |
| 3,160,011 A | 12/1964 | Ogden |
| 3,173,348 A | 3/1965 | Betinis |
| 3,182,508 A | 5/1965 | Varju |
| 3,270,564 A | 9/1966 | Evans |
| 3,353,282 A | 11/1967 | Sneed |
| 3,359,005 A | 12/1967 | Cameron |
| 3,364,751 A | 1/1968 | Cornell et al. |
| 3,408,750 A | 11/1968 | McCollough et al. |
| 3,429,571 A | 2/1969 | Abel, Jr. |
| 3,469,905 A | 9/1969 | Baldwin et al. |
| 3,508,440 A | 4/1970 | Murphy |

(Continued)

FOREIGN PATENT DOCUMENTS

JP   A-11-340516   12/1999

(Continued)

OTHER PUBLICATIONS

Japanese Office Action dated Apr. 20, 2009 of corresponding Japanese Patent Application No. 2005-348080.

(Continued)

*Primary Examiner* — Ronald Laneau
(74) *Attorney, Agent, or Firm* — Murphy & King, P.C.

(57) ABSTRACT

The present invention is directed to a monitor system that measures flight characteristics of at least one object moving in a predetermined field-of-view using at least one fluorescent marker. In one embodiment, the emission spectra of the fluorescent marker is preferably narrow and substantially symmetric. It may be desirable for the fluorescent marker to be capable of responding to a broad excitation spectra. Preferably, the fluorescent markers comprise quantum dots. The quantum dots may be manufactured in any desired manner, and may comprise semiconductors, gold atoms, and the like.

44 Claims, 16 Drawing Sheets

U.S. PATENT DOCUMENTS

| | | |
|---|---|---|
| 3,513,707 A | 5/1970 | Russell |
| 3,566,668 A | 3/1971 | Browning |
| 3,589,732 A | 6/1971 | Russell et al. |
| 3,598,976 A | 8/1971 | Russell |
| 3,630,601 A | 12/1971 | Lehovec |
| 3,633,007 A | 1/1972 | Sanders |
| 3,633,008 A | 1/1972 | Sanders |
| 3,671,724 A | 6/1972 | Sanders |
| 3,717,857 A | 2/1973 | Evans |
| 3,759,528 A | 9/1973 | Christophers |
| 3,788,647 A | 1/1974 | Evans |
| 3,792,863 A | 2/1974 | Evans |
| 3,793,481 A | 2/1974 | Ripley et al. |
| 3,804,518 A | 4/1974 | Meyr |
| 3,806,131 A | 4/1974 | Evans |
| 3,818,341 A | 6/1974 | Burdick |
| 3,820,133 A | 6/1974 | Adorney et al. |
| 3,918,073 A | 11/1975 | Henderson et al. |
| 3,935,669 A | 2/1976 | Potrzuski et al. |
| 3,945,646 A | 3/1976 | Hammond |
| 3,992,012 A | 11/1976 | Campbell |
| 4,005,261 A | 1/1977 | Sato et al. |
| 4,025,718 A | 5/1977 | Paretti |
| 4,033,318 A | 7/1977 | O'Grady |
| 4,041,293 A | 8/1977 | Kihlberg |
| 4,063,259 A | 12/1977 | Lynch et al. |
| 4,088,324 A | 5/1978 | Farmer |
| 4,136,387 A | 1/1979 | Sullivan et al. |
| 4,137,566 A | 1/1979 | Haas et al. |
| 4,138,118 A | 2/1979 | Budney |
| 4,148,096 A | 4/1979 | Haas et al. |
| 4,155,555 A | 5/1979 | Fink |
| 4,158,853 A * | 6/1979 | Sullivan et al. ............... 348/157 |
| 4,160,942 A | 7/1979 | Lynch et al. |
| 4,223,891 A | 9/1980 | Van Gaasbeek et al. |
| 4,239,227 A | 12/1980 | Davis |
| 4,306,722 A | 12/1981 | Rusnak |
| 4,306,723 A | 12/1981 | Rusnak |
| 4,327,918 A | 5/1982 | Foster |
| 4,342,054 A | 7/1982 | Terui et al. |
| 4,360,199 A | 11/1982 | Jackson |
| 4,375,887 A | 3/1983 | Lynch et al. |
| 4,461,477 A | 7/1984 | Stewart |
| 4,477,079 A | 10/1984 | White |
| 4,570,607 A | 2/1986 | Stokes |
| 4,580,786 A | 4/1986 | Shipley |
| 4,630,829 A | 12/1986 | White |
| 4,640,120 A | 2/1987 | Garritano et al. |
| 4,684,133 A | 8/1987 | Maroth |
| 4,695,888 A | 9/1987 | Peterson |
| 4,695,891 A | 9/1987 | Peterson |
| 4,711,754 A | 12/1987 | Bednar |
| 4,713,686 A | 12/1987 | Ozaki et al. |
| 4,759,219 A | 7/1988 | Cobb et al. |
| 4,822,042 A | 4/1989 | Landsman |
| 4,830,377 A | 5/1989 | Kobayashi |
| 4,834,376 A | 5/1989 | Steinberg |
| 4,844,469 A | 7/1989 | Yasuda et al. |
| 4,858,934 A | 8/1989 | Ladick et al. |
| 4,861,034 A | 8/1989 | Lee |
| 4,870,868 A | 10/1989 | Gastgeb et al. |
| 4,893,182 A | 1/1990 | Gautraud et al. |
| 4,898,388 A | 2/1990 | Beard, III et al. |
| 4,898,389 A | 2/1990 | Plutt |
| 4,930,787 A | 6/1990 | Nobles, Jr. |
| 4,940,236 A | 7/1990 | Allen |
| 4,967,596 A | 11/1990 | Rilling et al. |
| 4,991,850 A | 2/1991 | Wilhlem |
| 4,991,851 A | 2/1991 | Melesio |
| 5,031,909 A | 7/1991 | Pecker |
| 5,054,785 A | 10/1991 | Gobush et al. |
| 5,056,791 A | 10/1991 | Poillin et al. |
| 5,082,283 A | 1/1992 | Conley et al. |
| 5,101,268 A | 3/1992 | Ohba |
| 5,111,410 A | 5/1992 | Nakayama et al. |
| 5,118,102 A | 6/1992 | Bahill et al. |
| 5,131,660 A | 7/1992 | Marocco |
| 5,179,441 A | 1/1993 | Anderson et al. |
| 5,184,826 A | 2/1993 | Hall, Jr. |
| 5,209,483 A | 5/1993 | Gedney et al. |
| 5,210,602 A | 5/1993 | Mintzer |
| 5,221,088 A | 6/1993 | McTeigue et al. |
| 5,226,660 A | 7/1993 | Curchod |
| 5,228,697 A | 7/1993 | Gulick et al. |
| 5,233,544 A | 8/1993 | Kobayashi |
| 5,246,232 A | 9/1993 | Eccher et al. |
| 5,247,835 A | 9/1993 | Howell |
| 5,259,617 A | 11/1993 | Soong |
| 5,269,177 A | 12/1993 | Miggins et al. |
| 5,297,796 A | 3/1994 | Peterson |
| 5,303,925 A | 4/1994 | Rawson |
| 5,309,753 A | 5/1994 | Johnson |
| 5,322,289 A | 6/1994 | Abrams et al. |
| 5,332,225 A | 7/1994 | Ura |
| 5,342,051 A | 8/1994 | Rankin et al. |
| 5,342,054 A | 8/1994 | Chang et al. |
| 5,375,844 A | 12/1994 | Waud |
| 5,377,541 A | 1/1995 | Patten |
| 5,395,116 A | 3/1995 | Blaakman |
| 5,419,563 A | 5/1995 | Abrams et al. |
| 5,435,561 A | 7/1995 | Conley |
| 5,437,457 A | 8/1995 | Curchod |
| 5,441,256 A | 8/1995 | Hackman |
| 5,441,269 A | 8/1995 | Henwood |
| 5,447,311 A | 9/1995 | Viollaz et al. |
| 5,469,627 A | 11/1995 | Denny et al. |
| 5,471,383 A | 11/1995 | Gobush et al. |
| 5,472,205 A | 12/1995 | Bouton |
| 5,474,298 A | 12/1995 | Lindsay |
| 5,482,283 A | 1/1996 | Wall |
| 5,486,002 A | 1/1996 | Witler et al. |
| 5,492,329 A | 2/1996 | Kronin |
| 5,501,463 A | 3/1996 | Gobush et al. |
| 5,575,719 A | 11/1996 | Gobush et al. |
| 5,582,552 A | 12/1996 | Hofmeister |
| 5,586,940 A | 12/1996 | Dosch et al. |
| 5,589,628 A | 12/1996 | Braly |
| 5,609,534 A | 3/1997 | Gebhardt et al. |
| 5,616,832 A | 4/1997 | Nauck |
| 5,623,459 A | 4/1997 | Iwamura et al. |
| 5,625,577 A | 4/1997 | Kunii et al. |
| 5,634,855 A | 6/1997 | King |
| 5,638,300 A | 6/1997 | Johnson |
| 5,672,809 A | 9/1997 | Brandt |
| 5,682,230 A | 10/1997 | Anfinsen et al. |
| 5,688,183 A | 11/1997 | Sabatino et al. |
| 5,694,340 A | 12/1997 | Kim |
| 5,697,791 A | 12/1997 | Nashner et al. |
| 5,707,298 A | 1/1998 | Chovanes |
| 5,709,610 A | 1/1998 | Ognjanovic |
| 5,779,241 A | 7/1998 | D'Costa et al. |
| 5,779,555 A | 7/1998 | Nomura et al. |
| 5,792,000 A | 8/1998 | Weber et al. |
| 5,792,001 A | 8/1998 | Henwood |
| 5,803,823 A | 9/1998 | Gobush |
| 5,803,826 A | 9/1998 | Perrine |
| 5,863,255 A | 1/1999 | Mack |
| 5,879,246 A | 3/1999 | Gebhardt et al. |
| 5,899,822 A | 5/1999 | Yamagishi et al. |
| 5,916,040 A | 6/1999 | Umazume |
| 5,989,135 A | 11/1999 | Welch |
| 6,034,723 A | 3/2000 | Fujimori |
| 6,042,483 A | 3/2000 | Katayama |
| 6,042,492 A | 3/2000 | Baum |
| 6,079,612 A | 6/2000 | Tung |
| 6,185,850 B1 | 2/2001 | Erkel |
| 6,186,002 B1 | 2/2001 | Lieberman et al. |
| 6,186,910 B1 | 2/2001 | Kobayashi |
| 6,195,090 B1 | 2/2001 | Riggins, III |
| 6,211,955 B1 * | 4/2001 | Basiji et al. .................... 356/326 |
| 6,213,888 B1 | 4/2001 | Kawaguchi et al. |
| 6,224,499 B1 | 5/2001 | Ogg |
| 6,231,453 B1 | 5/2001 | Jebe |
| 6,241,622 B1 | 6/2001 | Gobush et al. |
| 6,249,341 B1 * | 6/2001 | Basiji et al. .................... 356/73 |
| 6,286,364 B1 | 9/2001 | Aoyama et al. |
| 6,292,130 B1 | 9/2001 | Cavallaro et al. |

| | | |
|---|---|---|
| 6,293,802 B1 | 9/2001 | Ahlgren |
| 6,320,173 B1 | 11/2001 | Vock et al. |
| 6,328,660 B1 | 12/2001 | Bunn, III |
| 6,390,934 B1 | 5/2002 | Winfield et al. |
| 6,398,670 B1 | 6/2002 | Engelhardt et al. |
| 6,410,990 B2 | 6/2002 | Taylor et al. |
| 6,431,990 B1 | 8/2002 | Manwaring |
| 6,441,745 B1 | 8/2002 | Gates |
| 6,473,176 B2 * | 10/2002 | Basiji et al. .................. 356/326 |
| 6,488,591 B1 | 12/2002 | Gobush et al. |
| 6,500,073 B1 | 12/2002 | Gobush et al. |
| 6,506,124 B1 | 1/2003 | Manwaring et al. |
| 6,533,674 B1 | 3/2003 | Gobush |
| 6,561,917 B2 * | 5/2003 | Manwaring .................. 473/151 |
| 6,579,190 B2 * | 6/2003 | Yamamoto .................. 473/141 |
| 6,592,465 B2 | 7/2003 | Lutz et al. |
| 6,602,144 B2 | 8/2003 | Manwaring et al. |
| 6,616,543 B1 | 9/2003 | Gobush et al. |
| 6,638,175 B2 | 10/2003 | Lee et al. |
| 6,764,412 B2 | 7/2004 | Gobush et al. |
| 7,291,072 B2 * | 11/2007 | Bissonnette et al. .......... 473/198 |
| 2001/0043757 A1 | 11/2001 | Asakura |
| 2002/0103035 A1 | 8/2002 | Lindsay |
| 2002/0173364 A1 | 11/2002 | Boscha |
| 2002/0173367 A1 | 11/2002 | Gobush et al. |
| 2004/0032970 A1 * | 2/2004 | Kiraly ............................ 382/103 |
| 2009/0237501 A1 * | 9/2009 | Lemmer et al. ................. 348/79 |

FOREIGN PATENT DOCUMENTS

| | | |
|---|---|---|
| JP | 2001-83088 | 3/2001 |
| JP | 2002-286641 | 10/2002 |
| JP | 2003-214819 | 7/2003 |
| JP | A-2004-523010 | 7/2004 |
| WO | WO 2004/003558 | 1/2004 |
| WO | WO 2004/023118 | 3/2004 |
| WO | WO 2004/050046 | 6/2004 |

OTHER PUBLICATIONS

Japanese Office Action dated Jan. 25, 2010 of corresponding Japanese Patent Application No. 2005-348080.

Japanese Office Action dated Aug. 23, 2010 of corresponding Japanese Patent Application No. 2005-348080.

* cited by examiner

PERFORMANCE MEASUREMENT SYSTEM WITH QUANTUM DOTS FOR OBJECT IDENTIFICATION

CROSS-REFERENCE TO RELATED APPLICATIONS

This application is a continuation-in-part application of U.S. application Ser. No. 10/002,174 filed on Dec. 5, 2001 now U.S. Pat. No. 7,086,954, which is incorporated in its entirety by reference herein.

FIELD OF THE INVENTION

The present invention relates to a monitor system with optical wavelength discrimination and fluorescent markers comprising quantum dots. More particularly, the present invention relates to a system for monitoring kinematics of golf equipment and a method for use thereof.

BACKGROUND OF THE INVENTION

Devices for measuring golf ball flight characteristics and club head swing characteristics are known. For example, the golf ball or golf club head may be marked with at least one contrasting area, used to generate optical images that may be used to determine performance characteristics. Some of these devices use retro-reflective tape or paint markers. Retro-reflective markers, however, result in a raised surface when placed on the golf ball and effect flight performance of the golf ball. It would therefore be desirable to provide a system which measures the launch or flight characteristics of a golf ball using markers that did not substantially effect the flight performance of the golf ball. In addition, non-fluorescent paint or ink-based markers and devices are ineffective in bright sunlight and do not provide sufficient optical discrimination of markers.

Devices for measuring two sports objects in a single swing are known, however, these systems have drawbacks relating to outdoor functionality, portability, accuracy, and ease of use. Thus, a need exists for a monitor system capable of capturing club motion data and ball motion data where the system is portable, easy to use, accurate, and adaptable for outdoor use.

SUMMARY OF THE INVENTION

According to one aspect, the present invention is directed to a method and apparatus for measuring the flight characteristics of an object using fluorescent optical markers. In particular, one embodiment contemplates a monitor system for measuring flight characteristics of an object, such as a golf ball and/or a golf club, with fluorescent markers. The flight characteristics are derived from data taken when the object is in a predetermined field-of-view. The system preferably includes at least a lighting unit with a light filter and at least one camera unit with a camera filter. The lighting unit directs light in the direction of the object. This light is filtered through a light filter or produced from a narrow wavelength light source, e.g., light emitting diodes, to allow only selected wavelengths of the light to contact the object. The filtered light illuminates the object causing the fluorescent markers on the object to exhibit fluorescence, and thus producing a reflected light at a longer wavelength than the light emitted from the light source. The camera unit is pointed toward the object. The camera filter inhibits the passage of all wavelengths except those in a selected range so that only a portion of the reflected light passes through the camera filter and is transmitted to the camera.

In one embodiment, the camera is a CCD camera with about 90,000 pixels or greater. In another embodiment, the camera has about 300,000 pixels or greater. In yet another preferred embodiment, the camera has about 1,000,000 pixels or greater.

The monitor system may further include a second camera unit pointed toward the object. The second camera unit also has a camera filter.

In one embodiment, the camera filter is a band pass filter. The bandwidth of the band pass filter may be about 60 run or less; preferably about 30 nm or less, and more preferably about 15 nm or less.

The light filter for use with the present invention may be a low pass filter. In one embodiment, the low pass cut off wavelength is at least 10 nm less than the center wavelength of the camera band pass wavelength. In another embodiment, the low pass cut off wavelength is at least 20 nm less than the center wavelength of the camera band pass wavelength. In one embodiment the light filter passes wavelengths of light less than 580 nm. Filters may have transmission of about 50 percent or greater, preferably about 70 percent or greater. In one embodiment, the filter transmission is about 85 percent or greater.

In one embodiment of the present invention, the fluorescent marker is an orange-fluorescent pigment with a peak transmission around about 600 nm. In yet another embodiment, the monitor system also includes a computer that generates data from images produced by the camera units. These images result from the reflected light that reaches each camera through its camera filter.

The present invention is also directed to a combination of an object, having at least one fluorescent marker, and a monitor system. The monitor system includes a discrete wavelength lighting unit and at least one camera unit. In one embodiment, a first light exits the lighting unit through a light filter towards the object so that only a portion of the first light passes therethrough to the object.

Alternatively, a light source that produces discrete wavelengths or a narrow spectrum of light, e.g., light emitting diodes, may be used. The first filtered light illuminates the fluorescent markers to produce an emission of a second light in the direction of the camera unit at a longer wavelength.

In one embodiment, the camera unit includes an associated camera filter through which the second light travels. Only a portion of the second light passes through the associated camera filter, thereby producing a second filtered light transmitted to the camera.

The present invention is also directed to a method for monitoring an object. The method includes the step of providing the object with at least one fluorescent marker. The method further includes directing a first light in the direction of the object, then filtering the light. The filtered light is reflected off of at least one fluorescent marker to produce a second light in the direction of at least one camera unit. One embodiment further includes filtering the second light to produce a second filtered light, and transmitting the second filtered light to the camera unit.

According to another embodiment of the present invention, the invention is a combination of at least two objects and a monitor system for measuring data for the objects in a predetermined field-of-view. The first object includes at least one first marker with a first reflectance spectra. In one embodiment, the second object includes at least one second marker with a second reflectance spectra significantly different from the first reflectance spectra. The monitor system includes at least one camera pointed toward the predetermined field-of-view. Each camera may further include a switchable filter so that at a first time the filter has a first center wavelength and at a second time the filter has a second center wavelength.

The present invention is also directed to a method of calculating club motion data and ball motion data using a monitor system. The method includes the steps of providing a club with at least one first marker with a first reflectance spectra; providing a ball with at least one fluorescent marker; and directing a light in a predetermined field-of-view. In one embodiment, the method further includes the steps of: reflecting the light off the at least one first marker to produce a first-reflected light; filtering the first-reflected light with a switchable filter at a first wavelength to produce a first filtered light; transmitting the first filtered light to a camera at a first and second time; changing the switchable filter to a second wavelength; reflecting the light of the at least one second marker to produce a second-reflected light; filtering the second-reflected light with the switchable filter set at the second wavelength to produce a second filtered light; and transmitting the second filtered light to the camera at a third and fourth time.

The present invention is also directed to a monitor system for measuring data for a club and a ball moving in a predetermined field-of-view. The system includes at least one camera with a filter pointed toward the predetermined field-of-view. Each camera obtains at least two club images in the predetermined field-of-view, and obtains at least two ball images in the predetermined field-of-view. The system may further include a computer to determine club motion data from the club images and ball motion data from the ball images.

The present invention is also directed to a portable monitor system for measuring the kinematics of at least one object. The system comprises an imaging system capable of acquiring images of at least one high speed object and at least one fluorescent marker selectively positioned on the surface of the at least one object. Preferably, the at least one fluorescent marker is capable of emitting a substantially narrow emission spectrum. It may also be desirable for the fluorescent marker to be capable of emitting a substantially symmetric emission spectrum. In one embodiment, the at least one fluorescent marker comprises quantum dots.

The imaging system may comprise a high speed shuttering system that is preferably capable of opening and closing in less than about 50 µs. More preferably, the high speed shuttering system is capable of opening and closing in less than about 100 µs. The high speed shuttering system may be desirable, for example, in order to acquire images of a high speed object in motion. Preferably, the shuttering system is capable of acquiring images of a high speed object moving at between about 50 mph and about 250 mph. More preferably, the at least one high speed object moves at between about 100 mph and 200 mph. In another embodiment, the at least one high speed object moves at about 50 mph or greater.

In one embodiment, the system may further comprise a light source. Preferably, the distance between the light source and the at least one object is about 100 inches or less. More preferably, the distance between the light source and the at least one object is about 80 inches or less. In another embodiment, the distance between the light source and the at least one object is preferably between about 20 inches and about 50 inches. It may be desirable for the energy in a single burst of light to be between about 0.25 joules and about 1.5 joules.

According to one aspect of the present invention, the imaging system comprises a filter. The filter comprises, for example, a band-pass filter. The filter may be used to allow the substantially narrow emission spectrum to pass through to the imaging system. Preferably, the substantially narrow emission spectrum comprises a Full-Width Half Maximum of less than about 50 nm. More preferably, the substantially narrow emission spectrum comprises a Full-Width Half Maximum of less than about 30 nm.

One advantage of using fluorescent markers comprising quantum dots is the increased fluorescence time. In one embodiment, the fluorescence time of the quantum dots is preferably about 200 ns or less. More preferably, the fluorescence time of the quantum dots is about 150 ns or less. In some embodiments, the quantum dots comprise semiconductors. In other embodiments, the quantum dots comprise gold atoms encapsulated in poly-amid amine dendrimers. It is desirable for the emission spectrum of the quantum dots to be varied based on the diameter of the quantum dots.

The present invention is also directed to a portable monitor system for measuring the kinematics of at least one object. The system comprises a camera and at least one fluorescent marker selectively positioned on the surface of the at least one object. Preferably, the fluorescent marker is capable of emitting a substantially symmetric emission spectrum. In one embodiment, the fluorescent markers comprise quantum dots. It is desirable for a first excitation wavelength to be capable of exciting a plurality of quantum dots to emit different emission spectra. The emission spectrum of the quantum dots may be based on the diameter of the quantum dots, which is preferably between about 0 nm and about 10 nm. In another embodiment, the diameter of the quantum dots is about 15 nm or less. The diameter of the quantum dots may be changed in order to emit an emission spectrum within the infrared spectrum. In one embodiment, the quantum dots may comprise semiconductors. The semiconductors that may be used include, but are not limited to, cadmium selenide, cadmium sulfide, zinc selenide, zinc sulfide, and lead selenide.

The present invention is also directed to a method of measuring the kinematics of at least one object. The method includes providing at least one object including at least one fluorescent marker thereon and acquiring one or more images of the at least one object in motion based on the at least one fluorescent marker. Preferably, the acquiring is based on a substantially narrow emission spectra emitted by the at least one fluorescent marker. The substantially narrow emission spectra may be isolated from other wavelengths based on, for example, band-pass filtering.

DETAILED DESCRIPTION OF THE PREFERRED EMBODIMENTS

Figure 1:
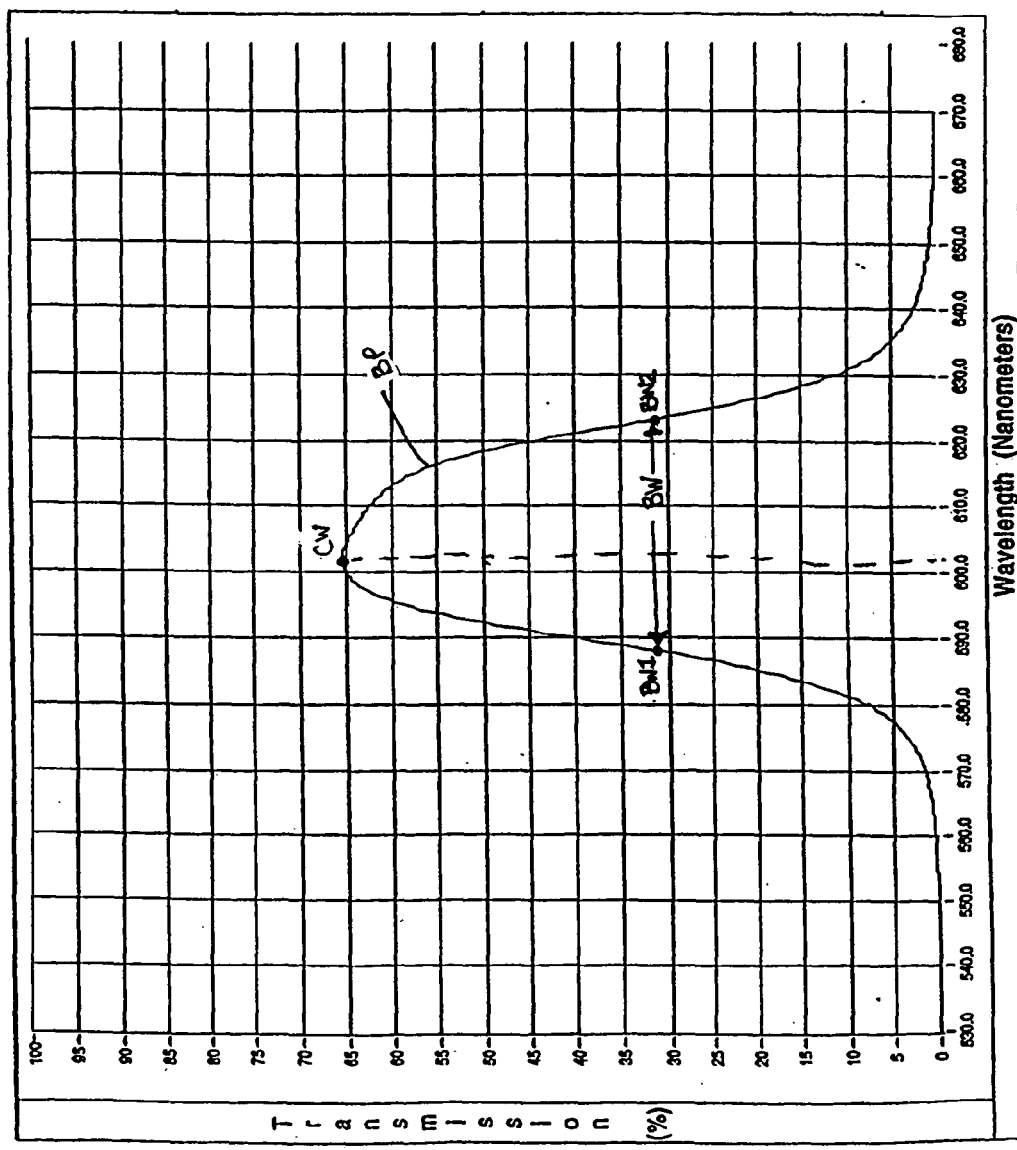
FIG. 1 is a graph showing transmission curves of a band pass camera filter with a center wavelength of 605 nm and bandwidth of 34 nm.

The present invention is related to a portable and accurate method and apparatus for measuring golf performance. In particular, the kinematic characteristics of an object are measured, such as a golf ball and a golf club, using at least one fluorescent marker, camera, filter, and central processing unit. The camera, lighting system, and markings on the object allow measurements, at discrete time intervals, of an object's position and orientation in a predetermined field-of-view.

The apparatus includes at least one lighting unit, used to direct light in the direction of the object and filtered through at least one light filter, or otherwise controlled, to allow only selected wavelengths of the light to contact the object, and at least one camera unit, with at least one camera filter, configured to point toward the object. The light illuminates the object to cause the fluorescent markers to reflect light toward the camera. The camera filter allows only a portion of the reflected light to pass through the camera filter and be transmitted to the camera at selected moments in time. Optionally, a narrow spectrum light source may be used to eliminate the need for a filter on the lighting unit. Narrow spectrum light sources preferably include light emitting diodes.

The activation of the system is initiated through the use of a trigger that may respond to object position or sound. In response to the trigger signal, a first image of the golf ball and/or golf club in the predetermined field-of-view is taken. The actuation of the cameras are controlled through shuttering electronics and via strobes used to take a picture of the object several times. For example, if the camera sensing element is active for 1 ms (1000 microseconds (μs)), the strobe may fire two times, preferably once at t=0 and again at about t=800 μs, producing, or "burning" two images of the markers on the camera's CCD. The camera system also includes a computer and monitor to process image data and determines the launch conditions of the object. Alternatively, an electronic shutter may be opened and closed rapidly, and a strobe light, remaining constant, may be used to acquire images of the markers at two discrete time intervals.

In one embodiment, the trigger communicates via an asynchronous protocol with the camera to control activation. In another embodiment, the cameras and strobes are controlled and communicate using an IEEE 1394 bus. Control and communication using the IEEE 1394 bus, or the like, advantageously eliminates complex cables and allows for a compact lightweight monitor system. The trigger used in one embodiment of this system is an acoustic trigger.

Although an acoustic trigger is used as the primary example to explain the system of the invention, a position-sensing trigger, e.g., an optical trigger, such as a laser or other apparatus, can also be used to initiate the system. For example, a light beam and a sensor system may be used so that when the golf ball or club moves through the light beam, the sensor sends a signal to the system. When a laser is used, the laser may be arranged such that a trigger is initiated as soon as the ball moves. For example, the laser may be directed or trained toward the teed golf ball and the first image may be taken as or shortly after the golf ball leaves the tee. An example of a suitable commercially available laser-based optical trigger is Model LV-H32 available from Keyence Corporation of New Jersey.

The Camera

The camera used is preferably an electro-optical camera with a light-receiving aperture, shutter, and light sensitive silicon panel. One example of such a camera is discussed in U.S. Pat. No. 5,575,719. Suitable commercially available cameras include, but are not limited to, Sony XCD-X700 (available from Sony Electronics Inc., Park Ridge, N.J.) and DragonFly (available from Point Grey Research, Vancouver, B.C.). A charge coupled device ("CCD") camera is preferred, but TV-type video cameras are also useful. In one embodiment, cameras based on CMOS technology are used. As discussed, the cameras may communicate through and be controlled by an IEEE 1394 bus or the like.

In one embodiment, the camera has a digital resolution of about 90,000 pixels or greater. In another embodiment, the camera has a digital resolution of about 300,000 pixels or greater, preferably, about 1,000,000 pixels or greater.

More than one camera may be used in the present invention. In an embodiment with a dual camera system, for example, the cameras are preferably asynchronous with external triggering capability and each have a digital resolution of about 100,000 pixels or greater, preferably about 500,000 pixels or greater. Additionally, cameras having the digital resolution values described in the preceding paragraph may also be used.

The camera is directed and focused on a predetermined field-of-view in which a golf ball moves and is imaged. The camera has a field-of view larger than necessary to image just a single golf ball. Thus, when using more than one camera, the predetermined field-of-view is the cameras' fields-of-view at the location where the cameras' lines-of-sight intersect. The angle between the cameras' lines of sight should be from about 0° to about 40°, preferably from about 10° to about 30°.

The optical shuttering systems used in the present invention may have an electronic device to successively control, i.e., activate and passivate, the influence of light on the camera. A non-limiting example of such a shutter is a ferroelectric liquid crystal shutter. In one embodiment, it may be desirable for the optical shuttering system to comprise a high speed shuttering system. One advantage of a high speed shuttering system is that images of high speed objects in motion may be acquired at discrete time intervals. This may be especially important in golf related applications, such as acquiring images of a golf club or golf ball in motion. Preferably, the time required to open and close the shuttering system is less than about 100 µs. More preferably, the time required to open and close the shuttering system may be less than about 50 µs. Most preferably, the time required to open and close the shuttering system may be less than about 25 µs.

The camera may be electrically connected to a microprocessor and a computer and monitor.

According to one aspect of the present invention, the camera may be used to acquire images of high speed objects in motion. Objects may include, for example, golf clubs, golf balls, and the like. In one embodiment, the camera is preferably capable of acquiring images of objects moving at between about 50 mph and about 250 mph. More preferably, the camera may be capable of acquiring images of objects moving at between about 100 mph and about 200 mph. In another embodiment, the camera is preferably capable of acquiring images of objects moving at about 50 mph or greater. More preferably, the camera may be capable of acquiring images of objects moving at about 150 mph or greater. Most preferably, the camera may be capable of acquiring images of objects moving at about 250 mph or greater.

The Camera Filter

The camera may be fitted with a filter to create greater contrast between the illuminated markers and other objects in the field-of-view. The filter used in the present invention is preferably a band pass filter used to inhibit wavelengths of light in selected ranges. In one embodiment, the filter used in the present invention has a center frequency, or center wavelength, around about 600 nm. Depending on the bandwidth of the filter used, e.g., 2, 10, 20, 40 nm, also referred to as filter precision, wavelengths of light from about 560 nm to about 640 nm may be allowed through the filter.

In some embodiments, as described in more detail below, the fluorescent markers may comprise quantum dots. In these embodiments, it may be desirable for the band pass filter to have a center frequency between about 350 nm and about 750 nm. Because of the narrow emission spectra of quantum dots, the bandwidth of the filter used may be substantially narrow. One advantage of using a band pass filter that has a substantially narrow bandwidth is that undesirable wavelengths may be filtered out, thereby preventing them from being imaged. In this manner, image contrast as measured by the difference between the grey level of the marker and peak background grey level at a specified F-stop may be increased.

For example, FIG. 1 shows a transmission curve for a band pass filter, labeled BP. The horizontal axis of the graph is the emission wavelength in nanometers (nm) for light and the vertical axis of the graph is the transmission value in percentage of total light (e.g., a transmission of 100 percent would signify no loss of light and no absorbency by the filter). The peak transmission of about 65 percent occurs at an emission wavelength of about 605 nm, labeled point CW, or the center wavelength. Bandwidth of the filter is determined at a 50% reduction of the peak transmission. For the curve BP, the 50% reduction of the peak transmission occurs at about 32% transmission, or about 588 nm, labeled as point $BW_1$, and about 622 nm, labeled as point $BW_2$. The width of the peak from point $BW_1$ to point $BW_2$ is about 34 nm, labeled BW. Therefore, all wavelengths of light less than about 588 nm and greater than 622 nm are significantly diminished via the band pass filter. Narrow bandwidths are preferred for bright light applications, such as outdoor use.

In one embodiment, the camera filter used in the system of the invention is an orange-interference filter preferably mounted in front of the camera(s). Suitable filters include those from Andover Corporation of Salem, N.H. and Edmund Scientific Corporation of Tonawanda, N.Y.

In another embodiment, a switchable filter is used. A recommended switchable filter is electronic and can change from a filter of one color to a filter of a different color in a short period of time. In one embodiment, the switchable filter is an optical filter with colors that are electronically tunable with a response or turning time of less than about 500 µs, more preferably a response time of less than about 50 µs, with no moving parts or vibration. In another embodiment, the switchable filter has a transmissibility about 60 percent or greater, preferably about 80 percent or greater.

In one embodiment, the switchable filter is able to alternate between three primary colors, e.g., an RGB filter that is switchable between red, green, and blue. A Varispec VS-RGB-GP liquid crystal tunable filter may be used to enable switching between a red filter and a green filter in about 250 µs. When a Varispec filter and a black-and-white camera is used, the filter may be mounted in any suitable way as to situate the filter between the camera lens and the camera.

The Lighting Unit

The lighting unit used in the system of the invention may be a dual strobe lighting unit. The strobe light unit includes at least one flash bulb assembly, the related circuitry, and a cylindrical flash tube. Preferably, the circuits used with the strobe light unit are similar to those disclosed in U.S. Pat. No. 6,011,359, the entire disclosure of which is incorporated herein by reference. In one embodiment, the dual strobe lighting unit includes two Vivitar Automatic Electronic Flash Model 283 strobe lights. In another embodiment, the system uses a dual strobe flash unit, such as those available from Unilux Inc., Saddle Brook, N.J. In yet another embodiment, the flash unit is an LED strobe, such as commercially available Model 5380 available from Illumination Technologies Inc., East Syracuse, N.Y. One skilled in the art would appreciate that the lighting units described herein are exemplary of the light sources for use with the present invention without limiting or restricting the use of other light sources.

In one embodiment of the invention, strobe lights are mounted to sequentially direct light, preferably filtered light, onto the predetermined field-of-view. The distance from the lighting unit to the object is preferably about 60 inches or less, and more preferably about 30 inches or less. Short light bursts are desirable to prevent elongation of optical markers. In one embodiment, the duration of the light for a single burst may be less than about 100 µs, preferably less than about 30 µs.

Alternatively, a flash unit with a single bulb and two separate discharge circuits may be used. Once the trigger signals the microprocessor, the strobe lighting unit sets off successive flashes and provides at least two bursts of light separated by less than about 2000 µs. In another embodiment, the at least two bursts of light are separated by less than about 1000 µs.

In embodiments where the fluorescent markers comprise quantum dots, the distance between the strobe lights or flash unit and the objects in motion may be increased. The increased distance is possible because of the increased quantum yield of the quantum dots. As a result of having increased quantum yield, the quantum dots may be more reactive. The increased reactivity allows the quantum dots to emit high intensity light even when the distance between the light source and the objects is increased. Preferably, the distance between the light source and the object is about 100 inches or less. More preferably, the distance between the light source and the object may be about 80 inches or less. In another embodiment, the distance between the light source and the object is preferably between about 15 inches and about 200 inches. More preferably, the distance between the light source and the object may be between about 20 inches and about 50 inches.

In other embodiments, however, it may be desirable to substantially minimize the distance between the light source and the one or more objects in order to increase the intensity of light emitted by the quantum dots. Those skilled in the art will recognize that one advantage of the increased intensity of emitted light is that the contrast of an acquired image may be improved.

In one embodiment, the energy in a single burst of light may be greater than about 1.5 joules, and more preferably may be greater than about 3.0 joules; most preferably greater than 6 joules. In another embodiment, the energy in a single burst of light is preferably between about 0.25 and about 1.5 joules. More preferably, the energy in a single burst of light may be between about 0.5 joules and 1.25 joules. Most preferably, the energy in a single burst of light may be between about 0.75 joules and about 1 joule.

Preferably, the strobe light communication and control is performed via an IEEE 1394 bus, or the like. The delay between an external asynchronous trigger signal and the activation of the first light burst, as well as the delay time between successive light bursts, is dictated by software on the control computer and is transmitted to the strobe unit via the 1394 bus prior to activation.

The Lighting Filter

In one embodiment, the filter used with the lighting system is mounted in any suitable way in front of the lighting unit to create a first filtered light. In another embodiment, the filter may be included with, or operatively connected to, the lighting unit. It is preferred that the excitation wavelength is distinct from the marker emission wavelength. While one skilled in the art would readily appreciate that there are several ways to accomplish this, one example is using a lighting filter chosen to have a cut off wavelength less than the center wavelength of the camera filter. This allows for definitive contrast between the emission wavelength and the excitation wavelength and, therefore, only the emitted light, i.e., the marker(s), will be imaged by the camera. The excitation light, i.e., the strobe light, would not be able to pass through the camera filter because the wavelength would not meet the filter's pass criteria.

In one embodiment, the lighting filter is a low pass filter with a cut off wavelength of at least about 10 m less than the lower end of the marker emission wavelength. For example, the low pass filter would have a cut off wavelength of about 10 mm or less than point $BW_1$, as previously described regarding FIG. 1. In particular, if the band pass filter used with the camera has a central emission wavelength of about 605 nm and a bandwidth of about 34 nm, the low pass filter used with the lighting system should have a cut off wavelength of about 580 nm or less (FIG. 1). Any cut off wavelength is acceptable providing the excitation and emission wavelength curves do not intersect near the center wavelengths of the respective curves.

The excitation wavelength preferably has a peak transmission at a center frequency or wavelength around about 450 nm. Lighting filters of the invention preferably have transmission of about 50 percent or greater, more preferably about 70 percent or greater. In one embodiment, the filter transmission is about 85 percent or greater.

Figure 2:
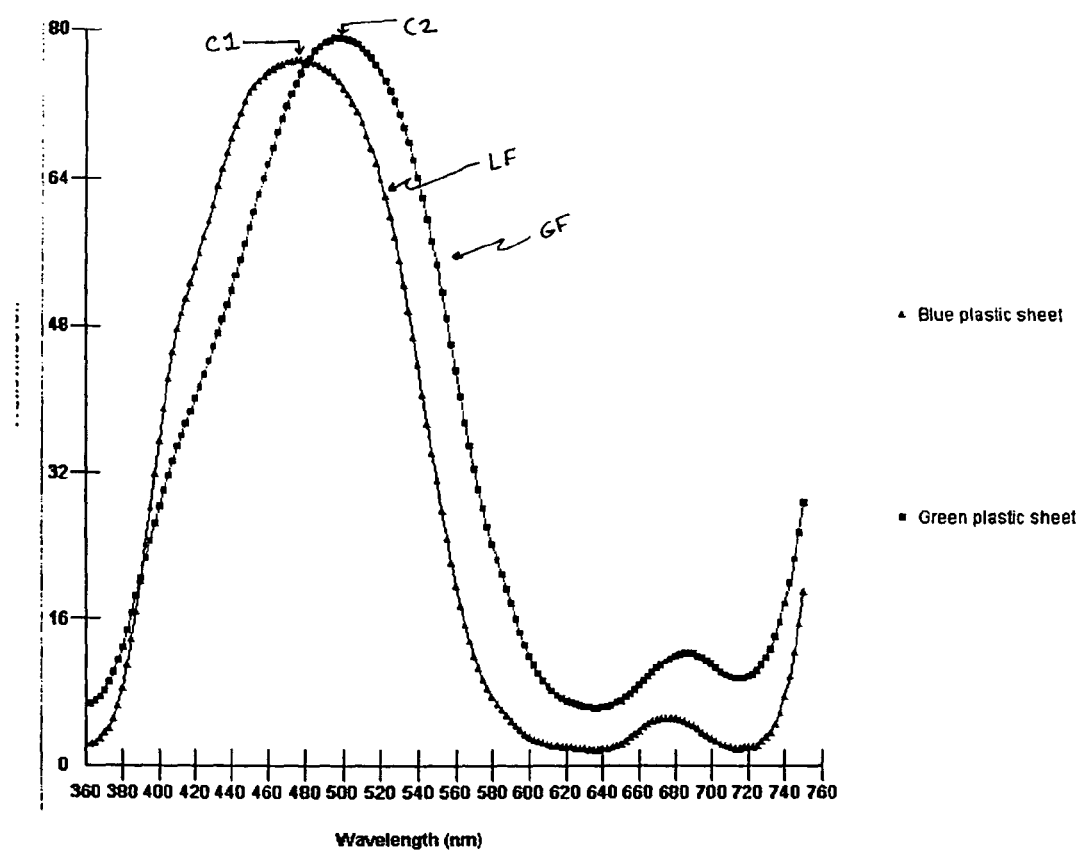
FIG. 2 is a graph showing transmission curves of low pass filters with cut off wavelength of about 560 and about 580 nm.

FIG. 2 shows an example transmission curve for a lighting filter of the present invention, labeled LF. The horizontal axis of the graph is the excitation wavelength in nanometers (nm) for light and the vertical axis of the graph is the transmission value, or excitation light emitted, in percentage of total light. The lighting filter curve LF shows a high transmission of about 79 percent occurring at point C1 with an excitation wavelength of about 460 nm. A transmission curve for a comparison green filter, labeled GF, is included for comparison purposes only. This curve shows how a higher transmission (occurring at point C2) in the emission wavelength range (about 500 nm) negatively affects the contrast of the image because of the high degree of overlap with the emission wavelength curve.

The Marker

Fluorescent markers include pigments or dyes that release electromagnetic radiation while absorbing another form of energy, but cease to emit the radiation immediately upon the cessation of the input energy. For example, the fluorescent markers useful with the present invention may obtain excitation energy from the lighting unit but cease to fluoresce as soon as the lighting unit is no longer functioning. This feature may be beneficial in the present invention. For example, this phenomena enables dual strobing to capture two discrete groups of markers on a single image frame with minimal blurring that might result from a slow decay of fluorescence.

Fluorescent markers may be identified by spectral emission tests. Spectral emission tests may be performed using, for example, the MacBeth Color-Eye 7000A in the specular excluded and UV included modes. Fluorescent markers typically have reflectance values exceeding 100 within the visible spectrum.

According to one aspect of the present invention, when a fluorescent marker is used with the present invention, the marker may be made of orange-fluorescent pigment, although other pigments may be used. The orange-fluorescent pigment can be from a variety of sources, for example, those manufactured by Dayglo Corporation of Cleveland, Ohio, Binney & Smith of Easton, Pa. (LIQUITEX®), and Kuretake Company of Japan.

Figure 3:
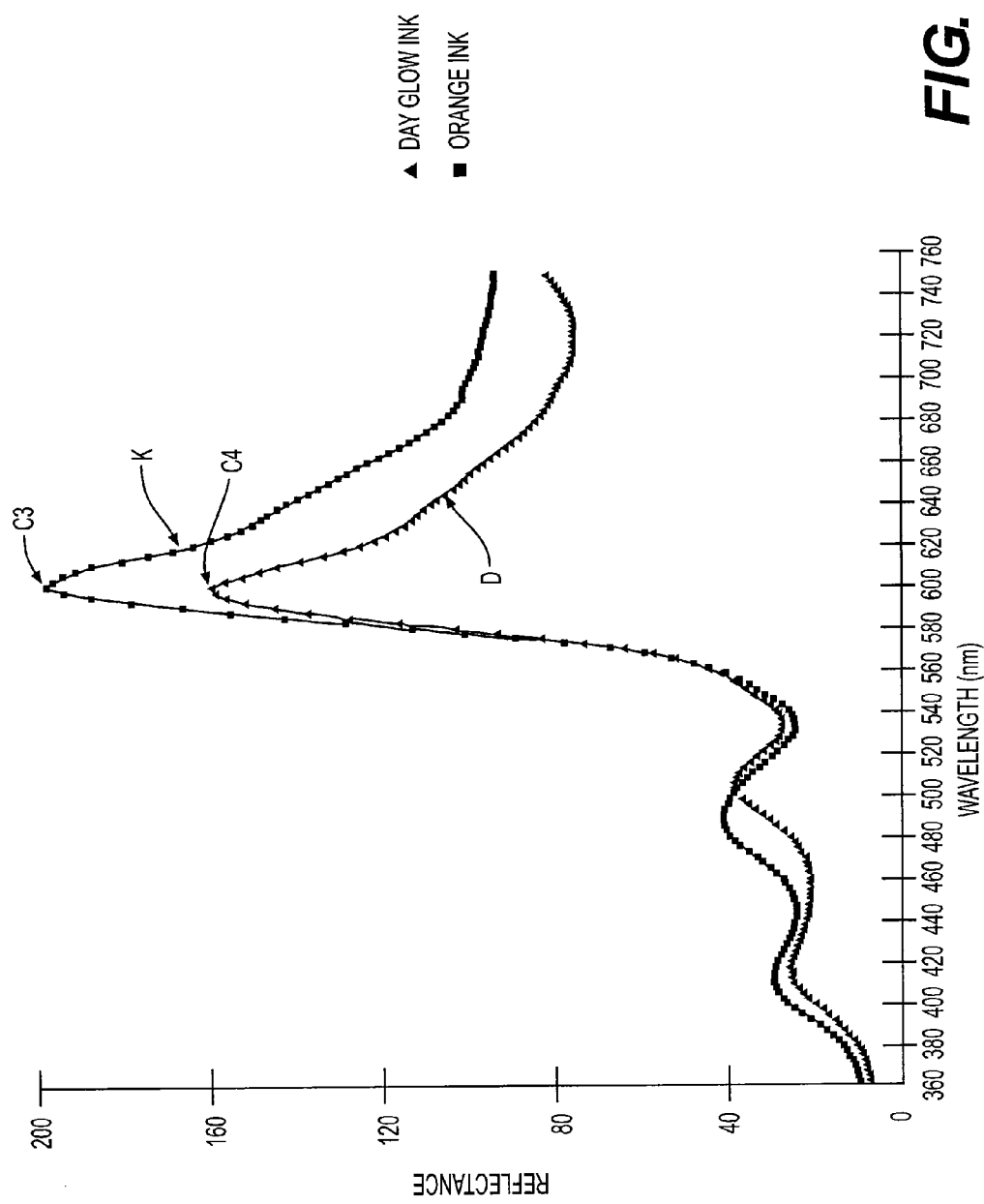
FIG. 3 is a graph showing a reflectance curve for two alternative fluorescent markers.

FIG. 3 shows reflectance curves for two orange-fluorescent pigments. FIG. 3 has a reflectance curve labeled D for the Dayglo pigment and a reflectance curve labeled K for the Kuretake pigment. The horizontal axis of the graph is a wavelength in nanometers (nm), and a vertical axis of the graph is a reflectance indicating the percentage of the light reflecting for a given wavelength. Reflectance is the amount of light that reflects off a given marker. For the Kuretake pigment (curve K), the highest or primary reflectance of about 200 percent occurs at point C3 with a wavelength of about 600 nm. For the Dayglo pigment (curve D), the highest or primary reflectance of about 160 percent occurs at point C4 with a wavelength of about 600 nm. Thus, the Kuretake pigment has better reflectance than the Dayglo pigment, however, either can be used in the system of the present invention. The curves K and D have the greatest reflectance over a range from about 560 nm to about 640 nm, and centered at the primary wavelength of about 600 nm.

Figure 15:
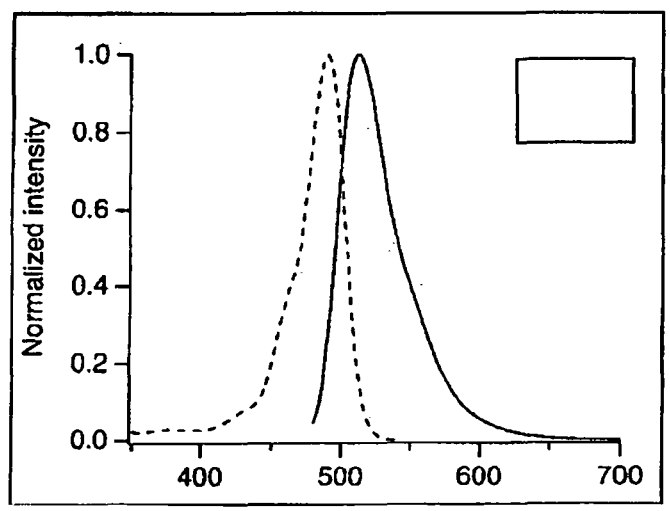
FIG. 15 is a graph showing the excitation spectrum and emission spectrum of fluorescent markers comprising organic pigments and/or dyes according to one exemplary embodiment.

According to another aspect of the present invention, the fluorescent markers may be capable of providing strong single wavelength emission and higher quantum yields than fluorescent markers that include pigments or dyes. Typically, fluorescent markers that include pigments or dyes are excited by a narrow excitation wavelength. In response, these fluorescent markers have a broad emission spectrum, as shown in FIG. 15. This may be advantageous in many golf applications.

However, in other applications it may be desirable to use fluorescent markers that are capable of emitting a substantially narrow excitation spectrum that is substantially symmetric. Preferably, these markers are capable of being excited by a broad excitation spectrum. One advantage of using a fluorescent marker that provides a substantially narrow emission spectrum is that a filter having a narrow bandwidth may be used in combination with an imaging system. By using a narrow bandwidth filter, undesirable wavelengths of light may be prevented from being acquired by the imaging system. Narrow filters reject more background noise and autofluorescent contamination. In this manner, the contrast of the markers relative to the background may be increased. This may be especially important in applications that employ high speed imaging analysis for studying objects in motion.

In one embodiment, fluorescent markers that are capable of responding to a broad excitation spectrum by emitting a narrow emission spectrum comprise quantum dots. Quantum dots, including their optical and physical properties and methods of manufacture are well known to those skilled in the art. The quantum dots may be manufactured in any desired manner. For example, according to one aspect of the present invention, the quantum dots comprise semiconductors. One example of quantum dots comprising semiconductors are semiconductor nanocrystals called EviDots™, and are manufactured by Evident Technologies, Inc. Preferably, semiconductor nanocrystals are capable of responding to a broad excitation spectrum by emitting a substantially narrow, substantially symmetric spectrum of light, as described above.

In another embodiment, the quantum dots comprise small clusters of gold atoms. These quantum dots preferably comprise clusters of gold atoms encapsulated in poly-amid amine (PAMAM) dendrimers. These quantum dots are preferably water soluble, strongly fluorescent, and display discrete excitation and emission spectra. In other embodiments, however, the quantum dots may comprise small clusters of atoms of any element, such as silver, platinum, titanium, and the like. Preferably, the quantum dots comprise clusters of about 100 or less atoms. More preferably, the quantum dots comprise clusters of about 50 or less atoms. In another embodiment, the quantum dots comprise clusters of between about 1 and about 1000 atoms. More preferably, the quantum dots comprise clusters of between about 1 and about 100 atoms.

One advantage of fluorescent markers that include quantum dots is that they have a longer fluorescence time than paint or ink based markers. The longer fluorescence time allows more light to be received by an imaging unit, thereby increasing the contrast of an acquired image. Preferably, the fluorescence time of the quantum dots is about 200 ns or less. More preferably, the fluorescence time of the quantum dots may be about 150 ns or less. Most preferably, the fluorescence time of the quantum dots may be about 100 ns or less.

Fluorescent markers comprising organic pigments and/or dyes typically bleach. In other words, the exciting light can cause the emission from the organic pigments or dyes to diminish over time based on the intensity of the exciting light. In one embodiment, however, quantum dots are significantly more stable than fluorescent markers comprising organic dyes and/or pigments. Accordingly, fluorescent markers comprising quantum dots exhibit substantially minimal diminished intensity over time. This is due to the fact that quantum dots are relatively stable, and do not bleach in the same manner as organic dyes and pigments.

Figure 16:
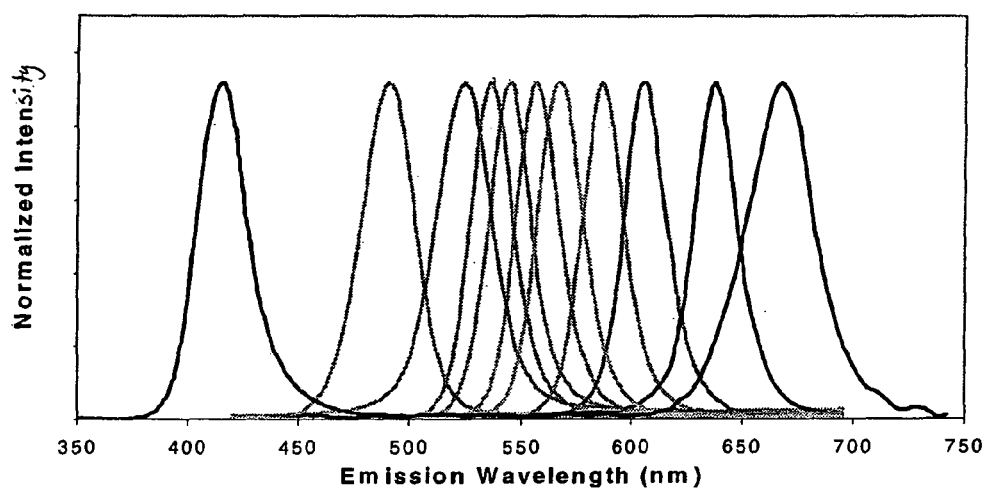
FIG. 16 is an exemplary graphical representation of the emission wavelengths of various fluorescent markers comprising quantum dots.

According to one aspect of the present invention, quantum dots are continuously color tunable across a range of wavelengths. These wavelengths may include, for example, the ultraviolet through the visible spectrum, and into the near infrared spectrum (350 nm-2300 nm). Typically, the emission spectra produced by the quantum dots comprises a sharp Gaussian spectra and a narrow FWHM (Full-Width Half-Maximum), as shown in FIG. 16. Preferably, the FWHM is less than about 50 nm. More preferably, the FWHM may be less than about 30 nm. Most preferably, the FWHM may be less than about 20 mm.

Figure 17:
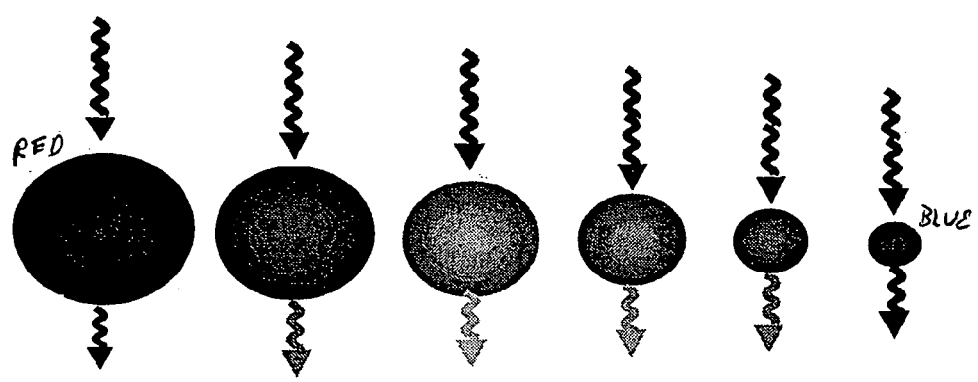
FIG. 17 is a diagram showing the relationship between the emitted wavelength of quantum dots and the size of the quantum dots according to one exemplary embodiment.

In one embodiment, the optical properties of the quantum dots, such as their emission spectrum, may be changed based on their diameter. As illustrated by FIG. 17, in one embodiment quantum dots comprising a smaller diameter result in an excitation peak at shorter wavelengths. Conversely, quantum dots comprising a larger diamter dots result in excitation peaks at longer wavelenghts. In one embodiment, quantum dots change color as their size changes because additional energy is required to "confine" the semiconductor excitation to a smaller volume. This is due to their size tunable optical properties that originate from the quantum confinement effect.

In one embodiment, the semiconductor nanocrystals comprise semiconducting materials such as cadmium selenide, cadmium sulfide, zinc selenide, zinc sulfide, and the like. The smaller the semiconductor nanocrystal, the shorter the emitted fluorescent wavelength. For example, cadmium selenide nanocrystals comprising a diameter of about 2.8 m have an emission wavelength that is centered at about 535 nm. However, when the diameter of the cadmium selenide nanocrystals is changed to about 5.6 mm, the emission wavelength is centered at about 640 nm. When desirable, nanocrystals comprising lead selenide of various diameters may emit fluorescence in the near infrared range. This range may be ideal, for example, in CCD imaging applications.

As mentioned above, the diameter of the semiconductor nanocrystals may be varied in order to achieve a desired emission wavelength. Preferably, the diameter of the semiconductor nanocrystals is between about 0 nm and about 15 nm. More preferably, the diameter of the semiconductor nanocrystals may be between about 1 and about 10 nm. In another embodiment, the diameter of the semiconductor nanocrystals is preferably about 15 nm or less. More preferably, the diameter of the semiconductor nanocrystals is about 10 nm or less.

The quantum dots may be included in the fluorescent marker in any desirable manner. For example, in one embodiment the quantum dots may be dispersed within a polymer such as UV or thermally cured epoxies, silicones, polyurethane, polystyrene, polycarbonate, PMMA, ink and paint binders, Silica and Titania Sol-gels, and the like. Alternately, the quantum dots may be combined with other organic fluorophores, metal ligand complexes, nono-oxides, and the like. Optionally, phosphor particles within the same matrix may be used for added material tuning capabilities.

As mentioned below, the fluorescent markers comprising quantum dots may be applied to an object, such as a golf ball or golf club, in any desired manner. Therefore, according to one aspect of the present invention, the quantum dots preferably start as a colloid that may be cast and/or cured into a variety of forms. It may be desirable for the quantum dot composites to be deposited as films or coatings. This may be accomplished, for example, based on spraying and screen printing, spin- and dip-coating, selective depositing through ink-jetting, and the like. In some embodiments, drawn fibers, beads, and cast bulk forms are all possible.

Figure 18:
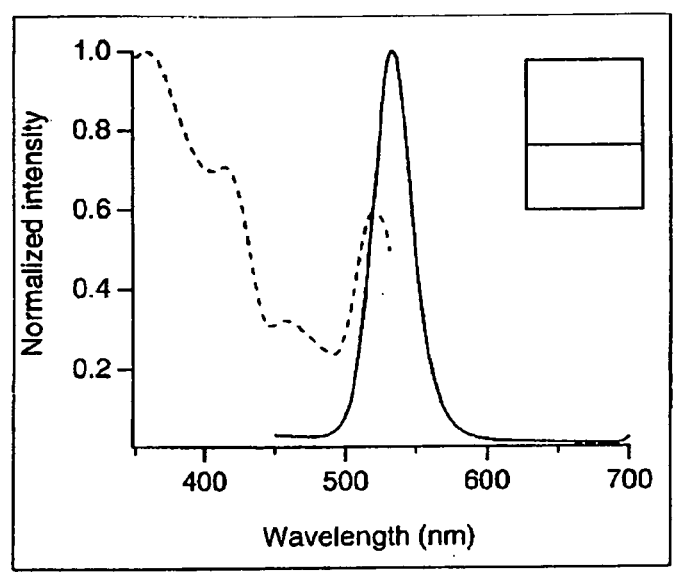
FIG. 18 is a graph showing the excitation spectrum and emission spectrum of fluorescent markers comprising quantum dots according to one aspect of the present invention.

As shown in FIG. 18, fluorescent markers comprising quantum dots may be excited by a broad spectrum of light and produce a narrow emission spectrum. This is because the absorption spectra of the quantum dots increases nearly monotonically for wavelengths shorter than the emission wavelength. In other words, multiple colors of quantum dots can be simultaneously excited using a single light source. Thus, combinations of quantum dots emitting different colors may all be excited by the same short wavelength source, such as a blue or a UV light source. The short wavelength source may include, but is not limited to, LED's, high and low pressure mercury lamps, and the UV emission used in plasma displays.

Figure 19:
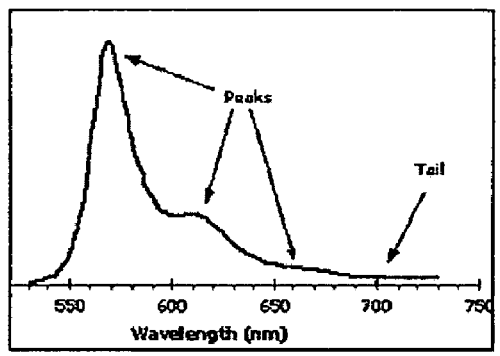
FIG. 19 is a graph showing one embodiment of an asymmetric emission spectrum.

One advantage of using quantum dots may be illustrated by comparison to fluorescent markers that comprise organic inks or dyes. For example, green fluorescent markers (based on organic inks or dyes) are imaged by camera systems that allow only orange light to pass. This is because organic dyes have an asymmetrical emission spectra that allows orange fluorescence to be generated. Asymmetrical emission spectra may include more than one peak of varying intensities, and a tail, as shown in FIG. 19. However, as shown in FIG. 18, fluorescent markers based on quantum dots provide a strong, single wavelength or mono-dispersed narrow emission spectra. Thus, one advantage of using fluorescent markers that include quantum dots is that more precise filters may be used, thereby excluding unwanted emission spectra.

The marker(s) can be applied to the golf ball or golf club using any suitable method known to those of ordinary skill in the art, e.g., pad printing, foil transfer, marking pens, and spray painting.

When monitoring a golf club and a golf ball simultaneously, it is preferred that the markers for the club and ball are distinguishable from each other. This may be accomplished by using markers of different sizes, shapes orientation, peak optical reflective wavelengths, or any combination thereof. Additionally, different types of markers for the club and the ball may be used. For example, the club may be marked with a fluorescent marker and the ball may be marked with a retro-reflective marker. Another example would be to use a diffuse-reflective circular marker on the ball and a triangular fluorescent marker on the club.

In one embodiment, the club marker has a first reflectance spectra and the ball marker has a second reflectance spectra. In another embodiment, the first reflectance spectra has a first primary response wavelength and the second reflectance spectra has a second primary response wavelength. In another embodiment, the first and second primary response wavelengths are separated by about 50 nm or greater. In yet another embodiment, the first and second primary response wavelength are separated by about 100 nm or greater. In one embodiment, the first primary response wavelength is 500 nm or greater, and the second primary response wavelength is about 600 nm or greater.

At least one marker should be used on the golf equipment, although it is preferred that at least two markers are used. In general, the markers should be positioned so that they reflect light from the golf ball or club in the predetermined field-of-view back to the camera(s) used to capture the images. In one embodiment, six or more markers are used on a golf ball and three or more markers are used on a golf club.

The placement of the markers on the golf ball or club can be changed in ways known to those of ordinary skill in the art. A non-limiting example, shown in FIG. 4, includes a golf ball 60 having six reflective markers, 60a-f, thereon. The marker 60f is centrally located on the ball and the markers 60a-e are disposed thereabout. The angle between the non-central markers 60a-e is designated as β. It is recommended that the angle β is between about 10° and about 40°. Most preferably, the angle β is about 30°. Although six markers are shown, a single line or as few as two markers or as many as eleven markers can alternatively be used on the ball. Another non-limiting example, shown in FIG. 5, includes a golf club 72 with a club head 74, a hosel 76, and a shaft 78. Three reflective markers, 72a-c, are placed at designated places on the club: 72a is located on the toe of the club head 74; 72b is located on the free end of the hosel 76; and 72c is located on the shaft 78. Alternatively, two markers can be placed on the toe and one on the hosel, or one marker can be placed on the toe and two markers can be placed on the hosel. Any arrangement of the markers on the golf ball or golf club is acceptable providing that the markers can reflect light back to the camera system.

Figure 5:
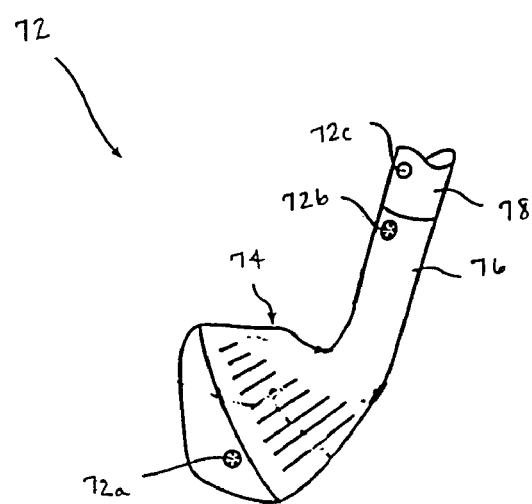
FIG. 5 is an enlarged, perspective view of a club head for use according one embodiment of the present invention.

As shown in FIG. 5, markers 60a-f and 72a-c may be rounded or circular in shape. If circular markers are used, it is preferred that the diameters of the markers are from about 0.05 inches to about 0.25 inches, more preferably about 0.1 inches to about 0.2 inches, and most preferably about 0.18 inches. The markers of the invention, however, are not limited to a circular shape, specific size, or diameter shown in the example.

The Monitor

The monitor used in the system may be an electronic character or graphical display that can be viewed outdoors. In one embodiment, the monitor display has an optical intensity of at least 500 candela per square meter (nit). The display may also be a liquid crystal display (LCD) or light-emitting diode (LED) display. In the embodiment using the LCD, the LCD preferably utilizes super twisted nematics (STN) or thin film transistor (TFT) technology.

In one embodiment, a touch screen is used to overlay a bright LCD panel. The operation of the touch screen system is based on capacitive, resistive, or optical techniques. In this embodiment, the operator may use the touch screen to display, store, or send collected kinematic data or to adjust system parameters prior to and after collecting the kinematic data.

The System

Figure 6:
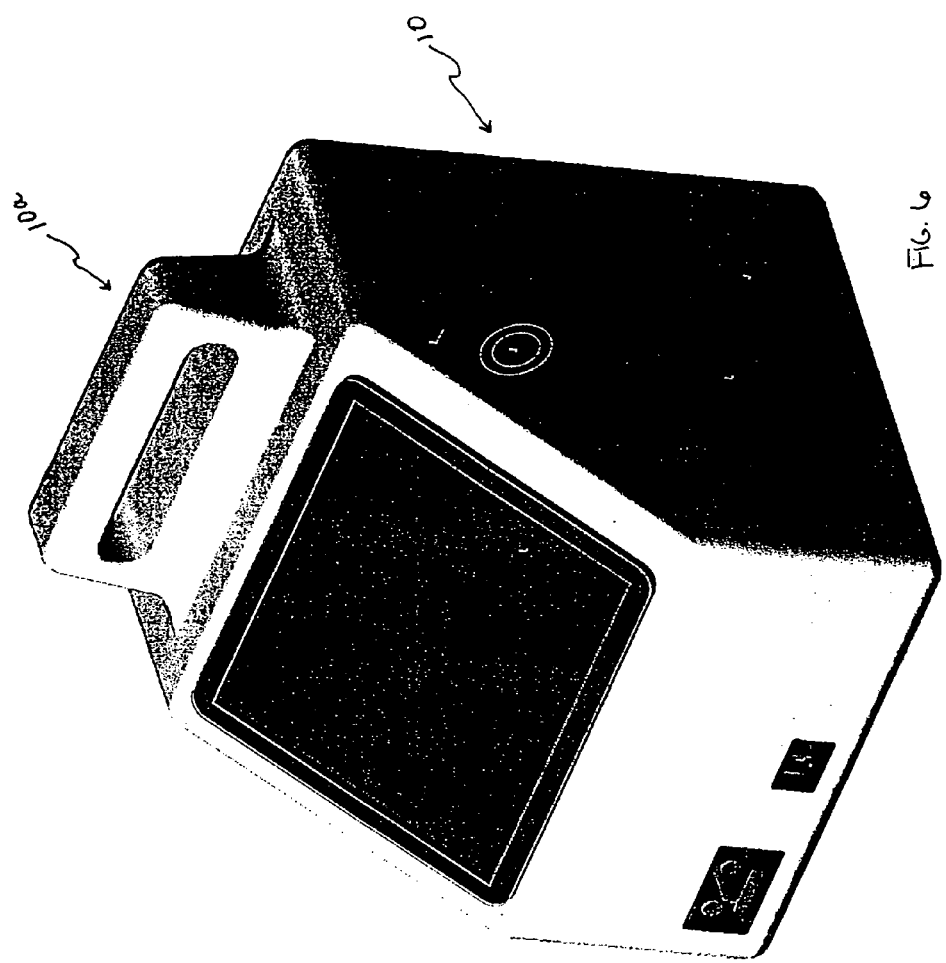
FIG. 6 is a perspective view of the portable system of the invention.

Preferably, the system of the invention weighs less than about 50 pounds and more preferably weighs less than about 25 pounds. In addition, preferably, the physical volume of the system is less than about 2 cubic feet. The entire system 10 (i.e., the camera, filters, lighting unit, central processing unit, and display) may be contained within a single housing capable of being carried with a handle 10a (shown in FIG. 6).

Figure 7:
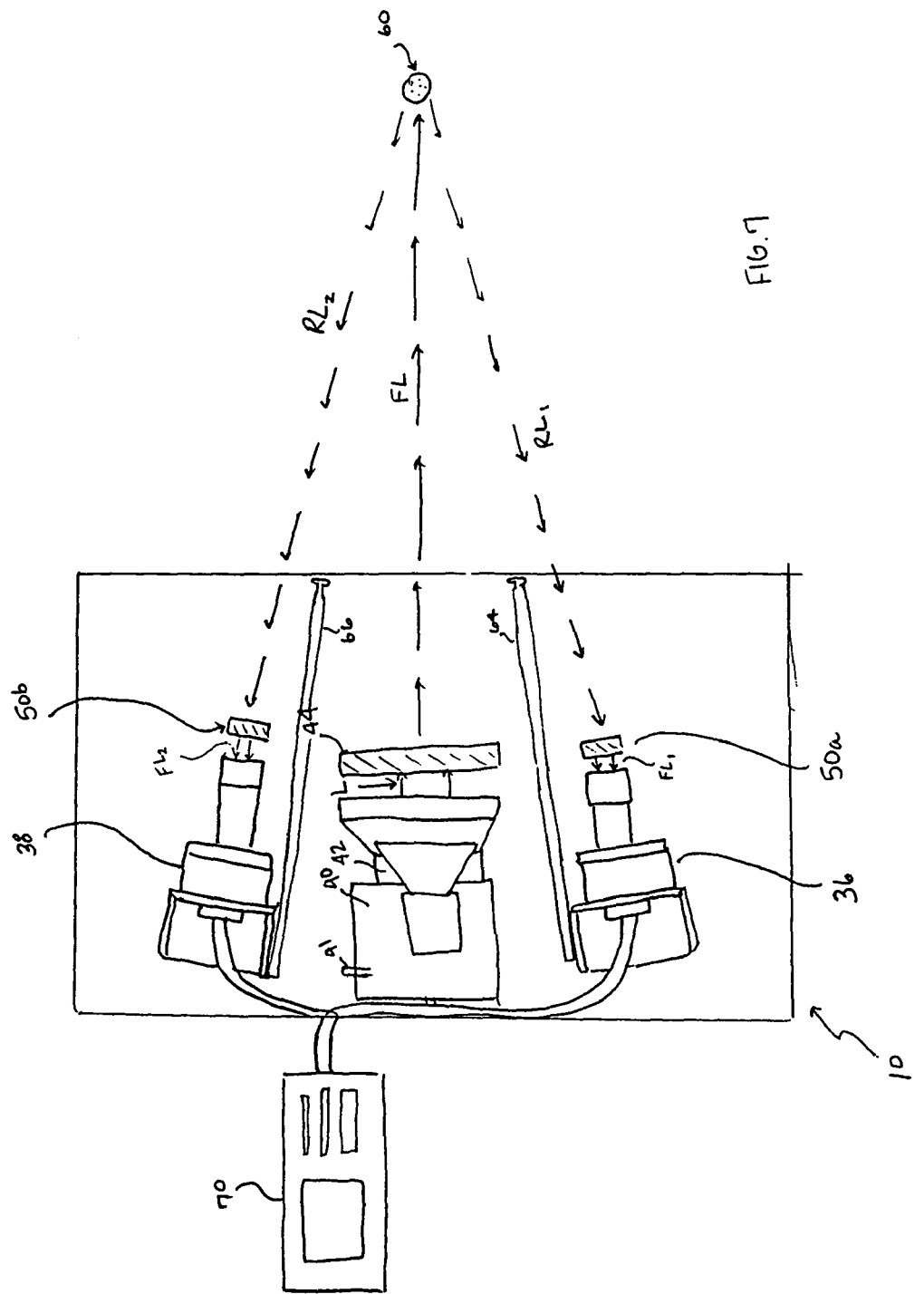
FIG. 7 is a top view of one arrangement of the system according to the present invention.

One suitable arrangement of the system, a portable, dual-camera monitoring system, is shown in FIG. 7. Other arrangements of the system, briefly discussed here, and fully detailed in co-pending U.S. patent application Ser. No. 09/782,278, include dual-camera systems, single camera systems, and systems for monitoring both the golf ball and the golf club simultaneously. Examples of other system arrangements are discussed in U.S. Pat. No. 6,241,622, the disclosure of which is incorporated in its entirety herein.

Monitoring system 10 includes a lighting box 40 and camera units 36, 38. In this embodiment, the lighting box 40 contains a centrally disposed trigger 41 and a dual strobe lighting unit 42. In other arrangements of the system, the trigger may be separate from the lighting unit. Filter 44 is disposed in front of the dual strobe lighting unit 42. Cameras 36, 38 are directed to the predetermined field-of-view, for example toward golf ball 60. Camera filters 50a, 50b are disposed in front of cameras 36, 38.

A single camera system is similar to system 10, however, the system includes a single camera unit, a single filter, an adjacent trigger contained in a lighting box, and a light source.

A ball camera and club camera system allow for simultaneous golf club and golf ball monitoring.

The system is similar to system 10, however, the system may also include a club monitor, a ball monitor, a microprocessor, and a computer and monitor. The club monitor includes a first club camera, a spaced second club camera, and a lighting box. Club filters are disposed in front of each club camera. The club monitor further includes a strobe light unit and a trigger within the lighting box. The ball monitor is similar to the club monitor and includes a first ball camera, a spaced second ball camera, and a lighting box. The ball monitor further includes a strobe light unit within the lighting box and ball filters are disposed in front of each ball camera.

In this arrangement, the club filters are preferably different colors from the ball filters. For example, the club filters can be red and the ball filters can be green. Such club filters allow the club cameras to view the strobe flashes, as reflected from the markers, in a red wavelength and such ball filters allow the ball cameras to view the strobe flashes, as reflected from the markers, in a green wavelength.

Another arrangement of the system, detailed in U.S. patent application Ser. No. 09/782,278, includes a strobe lighting unit with four capacitors and at least one camera unit that is preferably a black-and-white CCD camera with a switchable filter with placement in front of the camera, as previously discussed. This arrangement includes at least one club motion sensor, the number of sensors corresponding with the number of cameras. The sensors are preferably photoelectric sensors manufactured by Tritronics and preferably used with a reflective mount as described in U.S. patent application Ser. No. 09/782,278.

Calibration and Operation

Figure 8:
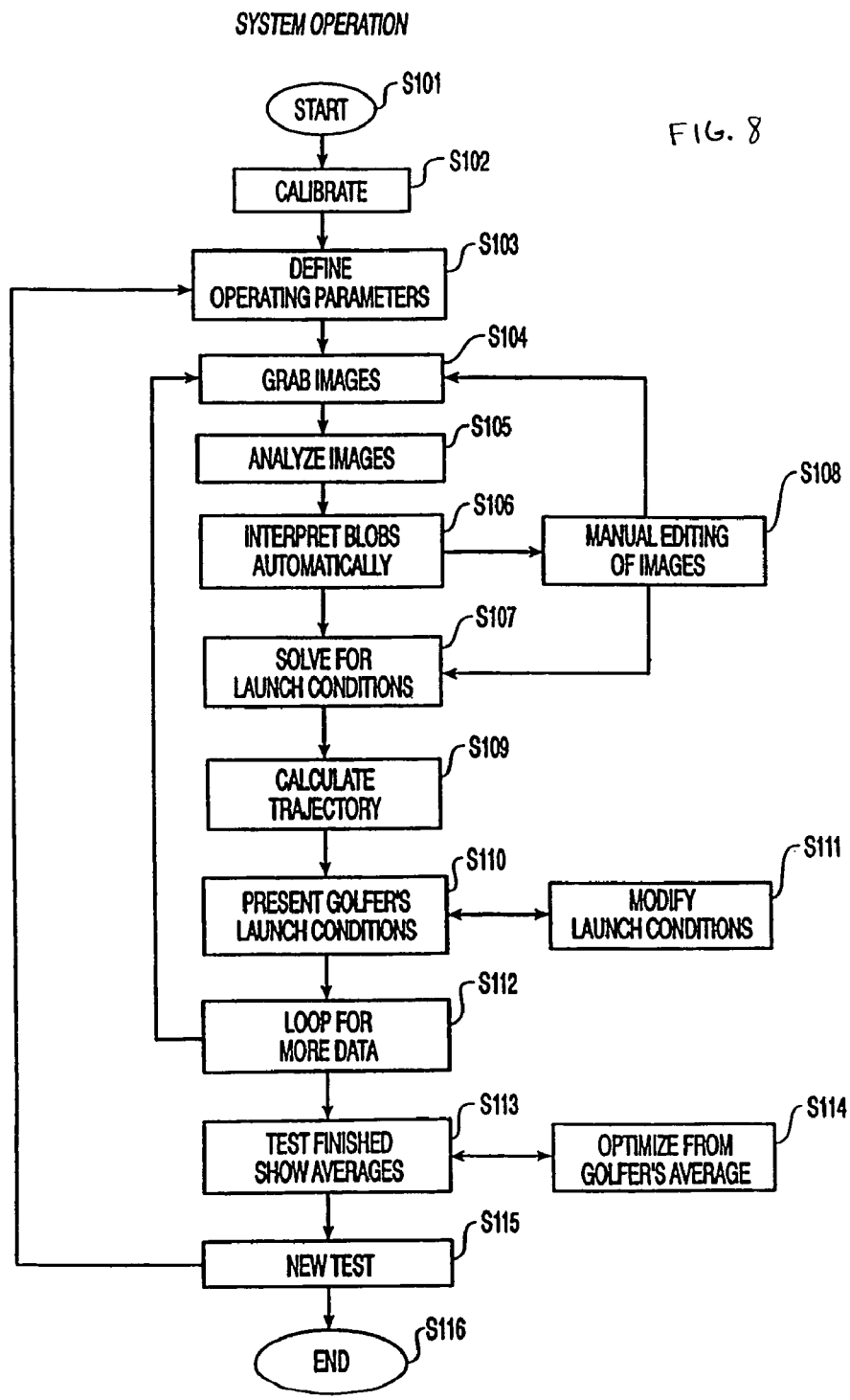
FIG. 8 is a flow chart describing the general operation and calibration of the system of the present invention.

The general calibration and operation of the system is shown in FIG. 8 in steps S101 to S116. The first step (Step S101), the system starts and determines if this is the first time the system has been used. By default, the system uses the last calibration when first activated. Therefore, the system should be calibrated each time it is moved and/or turned on.

After starting up the system, calibration begins to define the coordinate system to be used by the system (Step S102). The details of the calibration step are disclosed in U.S. Pat. No. 6,241,622. For example, a single camera system may be calibrated through calculation of the distance between dots.

Optional telescoping distance calibrators 64, 66 may also be used in the system 10, as shown in FIG. 7. The telescoping members are used in calibrating the monitoring system 10 at the appropriate distance from an object to be monitored. Distance calibrators 64, 66 are extendable members such as conventional radio antennae.

After the system is calibrated, operating parameters are defined (Step S103), i.e., left- or right-handed orientation depending on the golfer to be tested. The selection of the left-handed orientation requires one set of coordinates to be used for the left-handed golfer while the right-handed system requires the use of another set of coordinates. Step S103 also involves setting the system in either test or demonstration mode. If the test mode is selected, the system saves the test data. In the demonstration mode, the system does not save the data. Additional data specific to the location of the test and the golfer is entered during Step 103. The operator may optionally enter data for ambient conditions, e.g., temperature, humidity, wind speed and direction, elevation, and type of turf to be used in making the calculations for the golf ball flight, roll, and total distance. The operator may also optionally input the personal data of the golfer, e.g., name, age, handicap, gender, golf ball type, and golf club used (type, club head, shaft).

After this data is entered, the system is ready for data collection or demonstration (Step S104). Steps S105-S107 involve the use of several algorithms stored in the system computer to determine the location of the golf ball and/or golf club relative to the monitor. After the computer has determined the location of the golf ball or club from the images, the system (and computer algorithms) determine the launch conditions. These determinations, which correspond to Steps S105, S106, and S107, include locating the bright area(s) in the images, determining which of those bright areas correspond to the marker(s) on the golf ball, and, then using this information to determine the location of the golf ball from the images, and calculate the launch conditions, respectively.

The use of the system may be explained using the dual-camera system of FIG. 7, however, the general concept remains the same when using other variations of the system, for example, a single camera system, a ball and club monitoring system, or a system using a narrow spectrum light source. The trigger 41 communicates to control the activation of the dual strobe lighting unit 42 and cameras 36, 38 to capture images. The dual strobe lighting unit 42 sets off successive flashes and light L is directed through the filter 44 creating a first filtered light FL with a wavelength centered around about 450 nm. Filtered light FL may be directed toward the golf ball 60 and reflected back from the markers 60*a-f*, as described in FIG. 4, as reflected light $RL_1$ and $RL_2$. $RL_1$ and $RL_2$ pass through camera filters 50*a*, 50*b*, respectively, so only portions of $RL_1$ and $RL_2$ are transmitted through as camera filtered light $FL_1$ and $FL_2$, respectively. $FL_1$ and $FL_2$ preferably have center wavelengths of light from about 560 nm to about 640 nm. $FL_1$ and $FL_2$ allow light to pass to the cameras 36, 38, respectively, to produces two images of the ball at positions I and II, as shown in FIG. 9, in a single image frame.

Figure 4:
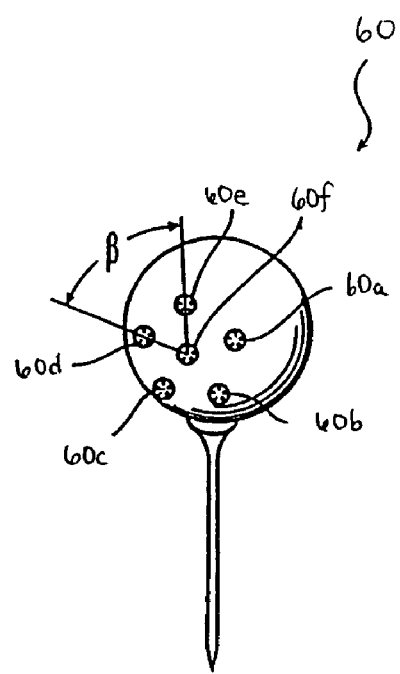
FIG. 4 is an enlarged, perspective view of a teed-up golf ball for use according to one embodiment of the invention.
Figure 9:
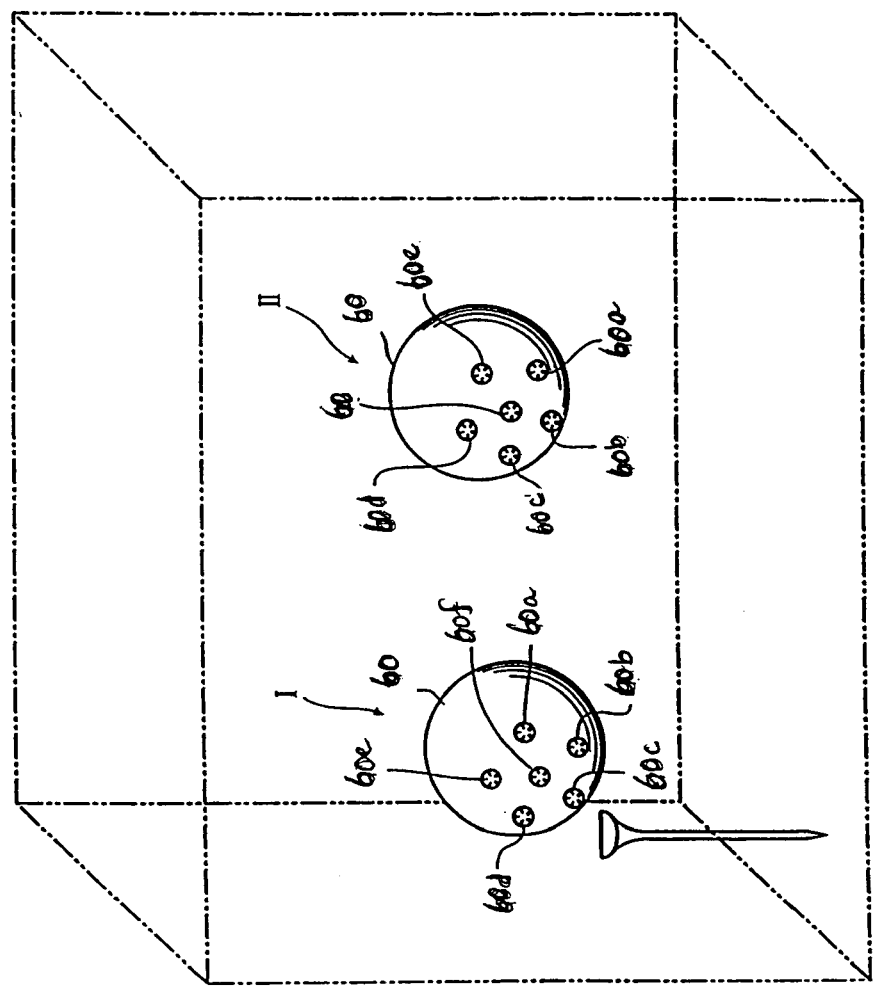
FIG. 9 is a perspective view of a three-dimensional rectilinear field-of-view showing the golf ball at two different positions I and II according to the present invention.

A marked golf ball 60 is shown as described according to FIG. 4, in the three-dimensional, predetermined, rectilinear field-of-view (shown in phantom) of FIG. 9, as imaged after being struck in two positions (I and II) at two distinct points in time. The camera filtered light FL1, FL2 each produce an image of the ball 60 at position I. The strobe light 42 is pulsed so that the filtering sequence above is repeated after a short time interval, preferably about 800 μs, to produce a second ball image 60 at position II.

Figure 10:
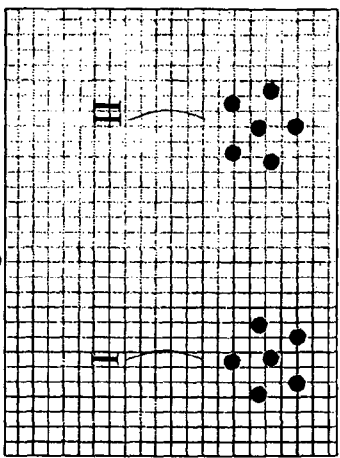
FIGS. 10-13 are graphical representations of pixel maps obtained by the cameras of the system according to one embodiment of the present invention.
Figure 11:
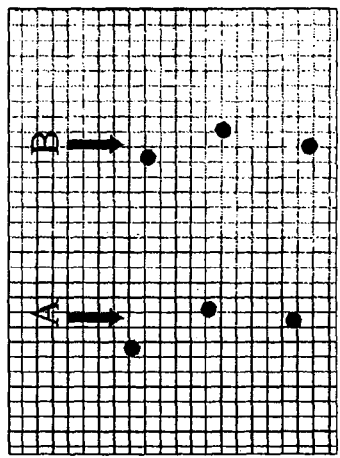

At Step S105, the system analyzes the images recorded by a silicon panel in the camera, by locating the bright areas in the images. FIGS. 10-11 are graphical representations of the pixel maps for both cameras 36, 38. The bright areas in the images, e.g., 60*a'-f'*, correspond to the first filtered light (FL) from the strobe lighting unit reflecting off of the markers as $RL_1$ and $RL_2$, passing through the camera filters 50*a* and 50*b*, and coming out as $FL_1$ and $FL_2$.

Specific to the ball camera and club camera arrangement, Step S104, involves a first swing sensor that sends a signal to the microprocessor to tell the computer to "arm" the ball cameras, during the club back swing, so that they are ready to fire when signaled. "Arming" the ball cameras clears and readies the panel within the CCD camera to be activated. The arming of the ball camera prior to taking images is due to the particular cameras used. If other cameras are used that more quickly clear and ready the panel, this step and an additional sensor may not be necessary. The signal is also sent to the microprocessor so that it is ready for the signal from a second swing sensor.

Figure 14:
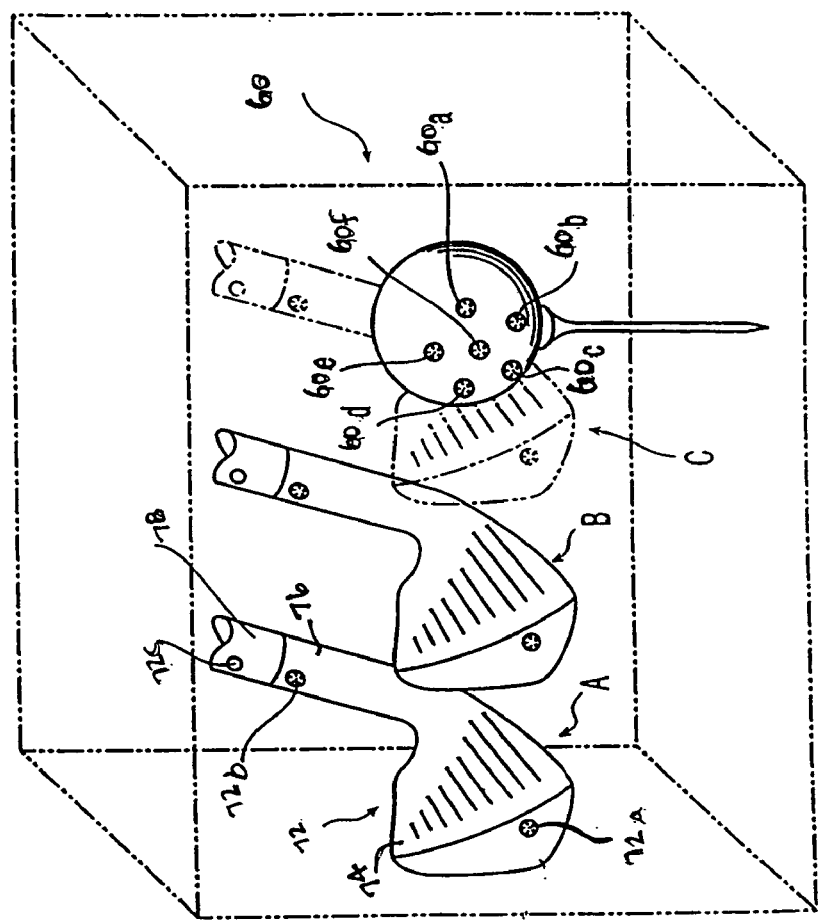
FIG. 14 is a perspective view of a three-dimensional field-of-view of a club head moving partially therethrough and showing a measurable position A, a measurable position B, and a projected impact position C according to one embodiment of the present invention.

After the ball cameras have been "armed", the second sensor causes the club monitor to strobe twice and produce light in the direction of the club on the club downswing. The light reflects off the club markers 72*a-c*, at positions A and B as shown in FIG. 14. The reflected light passes through the club filters and then is transmitted to the cameras sensory grid panels that are exposed. The club monitor strobes during the same exposure of the sensory grid panels so that the filtered light produces two images of the club head at position A and B in a single frame and the ball on the tee.

Figure 12:
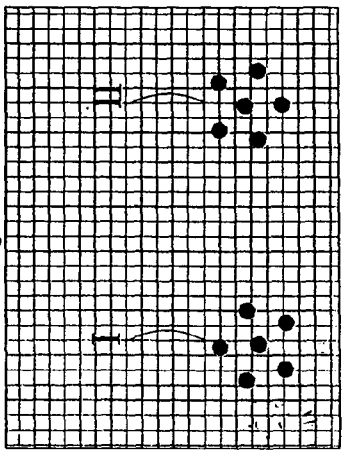
Figure 13:
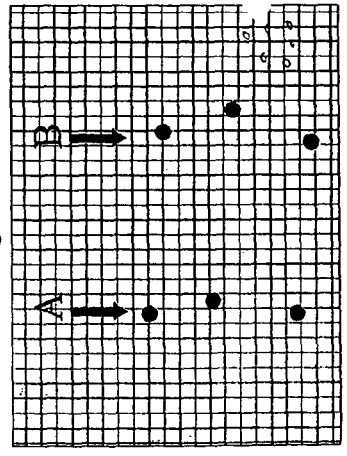

Graphical representations of the pixel maps for the club cameras are shown in FIGS. 12-13. The system should find six bright areas that represent the club markers 72*a'-c'*.

The ball and club markers are preferably arranged as discussed above and shown in FIGS. 4 and 5. The ball and club markers used should correspond to the ball and club filters (e.g., when green ball filters and red club filters are used, green ball markers and red club markers, respectively, can be used). The ball and club markers, as previously discussed, could differ, e.g, the ball markers can be fluorescent and the club markers can be retro-reflective.

Referring to the system using switchable filters briefly outlined above, and explained here using two cameras 36, 38, Step S104 begins with the operation of a first club motion sensor when the club 72 moves through the player's back swing. The sensor sends a signal to a microprocessor to tell the computer 70 to open the shutter of the cameras 36, 38 that are stereo-viewing the scene. The signal is also sent to the microprocessor to prepare for the signal from a second club motion sensor.

On the downswing, the beam from second club motion sensor is broken and a strobe light flashes twice. With each light flash from the strobe lighting unit 42, electrical energy from a capacitor is drained, in particular, the downswing drains the electrical energy from two of the four capacitors. The light reflected off the club markers 72*a-c* is filtered by the switchable filters in a corresponding filter mode (e.g., red retro-reflective club markers and a red filter). A trigger 41, i.e., a microphone, senses the sound of the collision of the golf club 72 with the golf ball 60 and provides a signal to the microprocessor to switch the filter from the first filter to the second filter, i.e., converts from red to green, or from "on" to "off".

After the filters are switched, a sequence of two flashes of light are then fired by the strobe light from the electrical energy stored in the remaining two capacitors. The light of the last two strobe flashes reflect off the reflective markers 60*a-f* on the golf ball 60, are filtered by the second filter, and then transmitted to the cameras 36, 38. The use of the second filter allows the club markers 72*a-c*, also included in the field-of-view, to be filtered out of the image. As previously discussed with respect to system 10, this arrangement of the system captures two images of both the club 72 and ball 60.

The system can then determine which of the bright areas correspond to the markers at Step S106. This analysis, which can be done in several ways, is discussed in detail in U.S. Pat. No. 6,241,622.

If the correct number of dots are found in the image, the system moves on to step S107 to determine, from the dots in the images, the position and orientation of the golf ball and/or club during the first and second images. However, if there are more or less than the expected dots or bright areas found in the images, Step S108 allows the operator to manually filter the images. If too few bright areas are located, the operator may adjust the image brightness, and if too many bright areas are present, the operator may delete them. In some instances, the bright areas in the images may be reflections off of other parts of the golf ball or off the golf club head. If it is not possible to adequately adjust the brightness or eliminate those extraneous bright areas, then the system returns the operator to Step S104 to have the golfer hit another golf ball. If the manual editing of the areas is successful, however, then the system goes to Step S107.

At Step S107, the system uses the identification of the markers in step S106 to determine the location of the centers of each of the markers in the images. Knowing the location of the center of each of the markers, the system can calculate the golf club's speed, loft angle, attack angle, path angle, face angle, droop angle, loft spin, face spin, droop spin, and hit location. In addition, the system can calculate the ball's velocity, launch angle, backspin, side angle, side spin rifling spin, carry distance, direction, carry and roll distance. Detailed information regarding the analysis of the images is in U.S. application Ser. No. 09/782,278.

After the spin rate, velocity, and direction are calculated, the system uses this information, as well as the ambient conditions and the golf ball information entered at Step S103 to calculate the trajectory of the golf ball during the shot (Step S109). The system estimates where the golf ball lands or carries, how far it rolls, and gives a total distance for the shot. Because the system is calibrated in three dimensions, the system also is able to calculate if the golf ball has been sliced or hooked, and how far the ball is off line, as discussed in U.S. Pat. No. 6,241,622.

This information (i.e., the golfer's launch conditions) is then presented to the golfer at Step S110, in numerical and/or graphical formats. At Step S111, the launch conditions can be modified to calculate the same information but for the hypothetical use of a different golf ball (e.g., two-piece as compared to a three-piece golf ball). It is also possible to determine the effect a variation in any of the launch conditions (e.g., golf ball speed, spin rate, and launch angle) would have on the results.

Step S112 provides the golfer the option to take more shots by returning the system to Step S104. For example, if the system is in test mode and the golfer takes a variety of shots, Step S113 can calculate the average of all shot data accumulated during the session. Step S114 provides ideal launch conditions for the golfer's specific capabilities, thereby allowing the golfer to make changes and maximize distance. After completing the session, Step S115 allows the golfer to start a new test with a new golf club or to end the session at Step S1116.

Thus, the system of the invention can be used to determine the kinematics of two colliding objects, where the measured kinematics data may be compiled into a database and the database can be accessible to a large user group via the internet or internet networks of computers that are linked in a conventional manner. The present invention is also directed to a computer providing on-course kinematic data acquired by the present system. This data may be posted on a computer and transmitted via the internet or intranet computer networks. This data may be provided, for example, for a fee that the computer may process. The data could also be sent from a golf pro shop to a club or ball manufacturer for equipment purchases or recommendations for a specific golfer.

While the above invention has been described with reference to certain preferred embodiments, it should be kept in mind that the scope of the present invention is not limited to just these embodiments. One skilled in the art would recognize numerous variations of the embodiments described herein without departing from the spirit and scope of the invention. For example, the system could be battery operated or include more than two cameras. In addition, the operating system could be an embedded computer or controlled with programmable logic controllers (PLC). Different markers or paints are possible, as well as the use of laser diodes with a narrower light range to avoid the use of filters. The invention may also include remote capability based on radio or infrared frequency. In addition, features of one embodiment can be combined with features of another embodiment. One skilled in the art may find other variations of the preferred embodiments which, nevertheless, fall within the spirit of the present invention, whose scope is defined by the claims set forth below.

What is claimed is:

1. A portable monitor system for measuring the kinematics of at least one object, comprising:

an imaging system comprising a high speed shuttering system operable to acquire images of at least one high speed object comprising at least one of a golf club and a golf ball; and at least one fluorescent marker selectively positioned on the surface of the at least one object, wherein the at least one fluorescent marker is operable to emit a substantially narrow emission spectrum, wherein the at least one fluorescent marker comprises quantum dots;

wherein the system is capable of calculating at least one of speed, loft angle, attack angle, path angle, face angle, droop angle, loft spin, face spin, droop spin, hit location, ball velocity, launch angle, backspin, side angle, side spin, rifling spin, carry distance, direction, carry and roll distance, spin rate, velocity, and direction.

2. The monitor system of claim 1, wherein the fluorescent marker is operable to emit a substantially symmetric emission spectrum.

3. The monitor system of claim 1, wherein the high speed shuttering system is operable to open and close in less than about 50 μs.

4. The monitor system of claim 1, wherein the high speed shuttering system is operable to open and close in less than about 100 μs.

5. The monitor system of claim 1, wherein the at least one high speed object moves at between about 50 mph and about 250 mph.

6. The monitor system of claim 1, wherein the at least one high speed object moves at between about 100 mph and 200 mph.

7. The monitor system of claim 1, wherein the at least one high speed object moves at about 50 mph or greater.

8. The monitor system of claim 1, further comprising a light source.

9. The monitor system of claim 8, wherein the energy in a single burst of light is between about 0.25 joules and about 1.5 joules.

10. The monitor system of claim 8, wherein the distance between the light source and the at least one object is about 100 inches or less.

11. The monitor system of claim 10, wherein the distance between the light source and the at least one object is about 80 inches or less.

12. The monitor system of claim 10, wherein the distance between the light source and the at least one object is between about 20 inches and about 50 inches.

13. The monitor system of claim 1, wherein the imaging system comprises a filter.

14. The monitor system of claim 13, wherein the filter comprises a band-pass filter.

15. The monitor system of claim 1, wherein the substantially narrow emission spectrum comprises a Full-Width Half Maximum of less than about 50 nm.

16. The monitor system of claim 1, wherein the substantially narrow emission spectrum comprises a Full-Width Half Maximum of less than about 30 nm.

17. The monitor system of claim 1, wherein the fluorescence time of the quantum dots is about 200 ns or less.

18. The monitor system of claim 1, wherein the fluorescence time of the quantum dots is about 150 ns or less.

19. The monitor system of claim 1, wherein the emission spectrum of the quantum dots is varied based on the diameter of the quantum dots.

20. The monitor system of claim 1, wherein the quantum dots comprise semiconductors.

21. The monitor system of claim 1, wherein the quantum dots comprise gold atoms encapsulated in poly-amid amine dendrimers.

22. A portable monitor system for measuring the kinematics of at least one object, comprising:

a camera comprising a high speed shuttering system; and at least one fluorescent marker selectively positioned on the surface of the at least one high speed object, wherein the fluorescent marker is operable to emit a substantially symmetric emission spectrum;

wherein the at least one fluorescent marker comprises quantum dots;

wherein the object comprises at least one of a golf club and a golf ball;

wherein the system is capable of calculating at least one of speed, loft angle, attack angle, path angle, face angle, droop angle, loft spin, face spin, droop spin, hit location, ball velocity, launch angle, backspin, side angle, side spin, rifling spin, carry distance, direction, carry and roll distance, spin rate, velocity, and direction.

23. The monitor system of claim 22, wherein the camera comprises a camera capable of acquiring images of high speed objects in motion.

24. The monitor system of claim 23, wherein the high speed objects move between about 50 and about 250 mph.

25. The monitor system of claim 22, wherein the quantum dots comprise semiconductors.

26. The monitor system of claim 25, wherein the semiconductors comprise one of cadmium selenide, cadmium sulfide, zinc selenide, zinc sulfide, and lead selenide.

27. The monitor system of claim 22, wherein the quantum dots comprise gold atoms encapsulated in poly-amid amine dendrimers.

28. The monitor system of claim 24, wherein the fluorescent marker emits a substantially narrow emission spectrum.

29. The monitor system of claim 28, wherein the substantially narrow emission spectrum comprises a Full-Width Half Maximum of less than about 50 nm.

30. The monitor system of claim 28, wherein the substantially narrow emission spectrum comprises a Full-Width Half Maximum of less than about 30 nm.

31. The monitor system of claim 22, wherein a first excitation wavelength is operable to excite a plurality of quantum dots to emit different emission spectra.

32. The monitor system of claim 22, wherein the emission spectrum of the quantum dots is based on the diameter of the quantum dots.

33. The monitor system of claim 32, wherein the diameter of the quantum dots is between about 0 nm and about 10 nm.

34. The monitor system of claim 32, wherein the diameter of the quantum dots is about 15 nm or less.

35. The monitor system of claim 22, wherein the emission spectra of the quantum dots is within the infrared spectrum.

36. A method of measuring the kinematics of at least one object based on a launch monitor comprising:

a launch monitoring system for executing the following steps:

providing at least one high speed object including at least one fluorescent marker thereon; and acquiring one or more images of the at least one object in motion based on the at least one fluorescent marker, wherein the acquiring is based on a substantially narrow emission spectra emitted by the at least one fluorescent marker, wherein the object comprises at least one of a golf club and a golf ball;

wherein the at least one fluorescent marker comprises a quantum dot; and wherein the system is capable of calculating at least one of speed, loft angle, attack angle, path angle, face angle, droop angle, loft spin, face spin, droop spin, hit location, ball velocity, launch angle, backspin, side angle, side spin, rifling spin, carry distance, direction, carry and roll distance, spin rate, velocity, and direction.

37. The method of claim 36, wherein the acquiring is based on a substantially symmetrical emission spectra emitted by the at least one fluorescent marker.

38. The method of claim 36, wherein the acquiring comprises filtering received wavelengths to allow only the substantially narrow emission spectra to pass.

39. The method of claim 38, wherein the filtering comprises band-pass filtering.

40. The method of claim 36, wherein the at least one quantum dot comprises a semiconductor.

41. The method of claim 36, wherein the at least one quantum dot comprises gold atoms.

42. The method of claim 41, wherein the gold atoms are encapsulated in poly-amid amine dendrimers.

43. The method of claim 36, wherein the object in motion is moving between about 50 mph and about 250 mph.

44. The method of claim 36, wherein a camera comprising a high speed shuttering system acquires the one or more images.

* * * * *